(12) United States Patent
Song et al.

(10) Patent No.: US 11,334,185 B2
(45) Date of Patent: May 17, 2022

(54) TOUCH UNIT AND A DISPLAY DEVICE INCLUDING THE SAME

(71) Applicant: SAMSUNG DISPLAY CO., LTD., Yongin-si (KR)

(72) Inventors: Sang June Song, Asan-si (KR); In Young Han, Hwaseong-si (KR); Tae Ik Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/887,421

(22) Filed: May 29, 2020

(65) Prior Publication Data

US 2021/0011602 A1 Jan. 14, 2021

(30) Foreign Application Priority Data

Jul. 9, 2019 (KR) ........................ 10-2019-0082523

(51) Int. Cl.
*G06F 3/041* (2006.01)
*G06F 3/044* (2006.01)

(52) U.S. Cl.
CPC ........ *G06F 3/04164* (2019.05); *G06F 3/0444* (2019.05); *G06F 3/0446* (2019.05)

(58) Field of Classification Search
CPC ......... G06F 2203/04111; G06F 3/0412; G06F 3/04164; G06F 3/0443; G06F 3/0444; G06F 3/0446; G06F 3/0448
See application file for complete search history.

(56) References Cited

U.S. PATENT DOCUMENTS

| 2015/0220193 | A1* | 8/2015 | Choe ..................... G06F 3/0443 345/174 |
| 2016/0299611 | A1 | 10/2016 | Park |
| 2017/0329434 | A1 | 11/2017 | Naito et al. |
| 2018/0157359 | A1 | 6/2018 | Lin et al. |

FOREIGN PATENT DOCUMENTS

| KR | 1020063018330 | 3/2006 |
| KR | 1020160016391 | 2/2016 |

* cited by examiner

*Primary Examiner* — Afroza Chowdhury
(74) *Attorney, Agent, or Firm* — F. Chau & Associates, LLC

(57) ABSTRACT

A touch unit is provided including a touch electrode disposed in a sensor region. A touch driving wire is connected to the touch electrode. The touch driving wire includes a first routing line connected to a first side of the touch electrode and a second routing line branched from the first routing line and connected to a second side of the touch electrode. A pad electrode line is spaced apart from the touch driving wire. The pad electrode line is connected to a pad. A pad connection line is connected to the touch driving wire and the pad electrode line. The pad connection line is disposed in a different layer from the touch driving wire. An area in which the pad connection line is in contact with the first routing line is greater than an area in which the pad connection line is in contact with the pad electrode line.

20 Claims, 18 Drawing Sheets

TOUCH UNIT AND A DISPLAY DEVICE INCLUDING THE SAME

This application claims priority under 35 U.S.C. § 119 to Korean Patent Application No. 10-2019-0082523 led on Jul. 9, 2019 in the Korean Intellectual Property Office, the disclosure of which is incorporated by reference herein in its entirety.

TECHNICAL FIELD

The present invention relates to a touch unit and a display device including the same.

DISCUSSION OF THE RELATED ART

Electronic devices, such as smartphones, tablet personal computers (PCs), digital cameras, laptop computers, navigation devices, and televisions (TVs) include a display device for displaying an image to a user. The display device includes a display panel configured to generate and display the image and various input devices.

Recently, touch units which detect a touch input have been applied to display devices, such as smartphones and tablet PCs. The touch unit detects a touch input of the user and calculates the touch input coordinates corresponding to a position of the touch input.

The touch unit includes first touch electrodes electrically connected in one direction, second touch electrodes electrically connected in another direction intersecting the one direction. Touch driving wires are connected to the first touch electrodes, and touch sensing wires are connected to the second touch electrodes. In this case, electrostatic defects may occur in a partial region of the touch driving wires, and thus, the touch unit may be rendered inoperable.

SUMMARY

According to an embodiment of the present invention, a touch unit is provided including a first touch electrode disposed in a touch sensor region of the touch unit. A touch driving wire is electrically connected to the first touch electrode. The touch driving wire includes a first routing line connected to a first side of the plurality of first touch electrodes and a second routing line branched from the first routing line and connected to a second side of the first touch electrode. A pad electrode line is spaced apart from the touch driving wire. The pad electrode line is connected to a pad. A pad connection line connected to the touch driving wire and the pad electrode line. The pad connection line is disposed in a different layer from the touch driving wire. An area in which the pad connection line is in contact with the first routing line is greater than an area in which the pad connection line is in contact with the pad electrode line.

According to an embodiment of the present invention, the pad connection line includes a first region in contact with the first routing line, and a width of the first region in a first direction is greater than a width of the second routing line in the first direction.

According to an embodiment of the present invention, the pad connection line includes a second region in contact with the pad electrode line, and the width of the first region in the first direction is greater than a width of the second region in the first direction.

According to an embodiment of the present invention, the touch driving wire includes a first touch driving wire and a second touch driving wire which are connected to different first touch electrodes. The pad connection line includes a first pad connection line and a second pad connection line. The first pad connection line is connected to the first touch driving wire and overlaps at least a portion of the second touch driving wire.

According to an embodiment of the present invention, the first pad connection line connected to the first touch driving wire further includes a third region overlapping the second routing line of the second touch driving wire. The width of the first region in the first direction is greater than a width of the third region in the first direction.

According to an embodiment of the present invention, a first touch conductive layer, a second touch conductive layer disposed above the first touch conductive layer, and a touch insulating layer disposed between the first touch conductive layer and the second touch conductive layer are provided. The pad electrode line includes a first pad electrode line and a second pad electrode line. The first pad connection line and the second pad connection line are composed of the first touch conductive layer. The first touch electrode, the first touch driving wire, the second touch driving wire, the first pad electrode line, and the second pad electrode line are composed of the second touch conductive layer.

According to an embodiment of the present invention, the touch insulating layer has first contact holes exposing a first end of each of the first pad connection line and the second pad connection line, and second contact holes exposing second ends of each of the first pad connection line and the second pad connection line. The first routing line of the first touch driving wire and the first routing line of the second touch driving wire are electrically connected to the first pad connection line and the second pad connection line, respectively, through the first contact holes. The first pad electrode line and the second pad electrode line are electrically connected to the first pad connection line and the second pad connection line, respectively, through the second contact holes.

According to an embodiment of the present invention, a touch unit is provided including a plurality of first touch electrodes disposed in a touch sensor region of the touch unit. A plurality of touch driving wires is electrically connected to the plurality of first touch electrodes. A plurality of pad electrode lines are spaced apart from the plurality of touch driving wires and connected to a plurality of pads. A plurality of pad connection lines connected to the plurality of touch driving wires and the plurality of pad electrode lines. The plurality of pad connection lines is disposed below the plurality of touch driving wires. The plurality of touch driving wires each include a first routing line connected to a first side of the plurality of first touch electrodes and a second routing line branched from the first routing line and connected to a second side of the plurality of first touch electrodes. The plurality of pad connection lines each include a first region in contact with the first routing line. The first routing line includes a fourth region that does not overlap a pad connection line of the plurality of pad connection lines. A width of the fourth region in a first direction is greater than a width of the first region in the first direction.

According to an embodiment of the present invention, a first touch conductive layer, a second touch conductive layer disposed above the first touch conductive layer, and a touch insulating layer disposed between the first touch conductive layer and the second touch conductive layer. The plurality of pad connection lines is composed of the first touch conductive layer. The plurality of first touch electrodes, the plurality of touch driving wires, and the plurality of pad electrode lines are composed of the second touch conductive layer.

According to an embodiment of the present invention, the touch insulating layer has a plurality of first contact holes exposing a first end of each of the plurality of pad connection lines and a plurality of second contact holes exposing a second end of each of the plurality of pad connection lines. The first routing line is electrically connected to the pad connection line through a first contact hole. A pad electrode line is electrically connected to the pad connection line through a second contact hole, and the first contact hole is formed in the first region.

According to an embodiment of the present invention, an area of the fourth region is greater than an area of the first region.

According to an embodiment of the present invention, the plurality of pad connection lines each have a second region in contact with the pad electrode line, and a width of the first region in the first direction is greater than a width of the second region in the first direction.

According to an embodiment of the present invention, a connection electrode connects adjacent first touch electrodes to each other in the first direction, and the connection electrode is composed of the second touch conductive layer.

According to an embodiment of the present invention, a plurality of second touch electrodes are spaced apart from the first touch electrodes in the touch sensor region. A plurality of touch sensing wires is electrically connected to the second touch electrodes. The plurality of second touch electrodes are composed of the first touch conductive layer, and the plurality of touch sensing wires are composed of the second touch conductive layer.

According to an embodiment of the present invention, a touch signal layer is disposed in the same layer as the plurality of pad connection lines and is spaced apart from the plurality of pad connection lines.

According to an embodiment of the present invention, the touch signal layer is disposed below the plurality of touch driving wires, and the touch signal layer at least partially overlaps the first routing line in a thickness direction.

According to an embodiment of the present invention, the first routing line is electrically connected to the touch signal layer through a third contact hole exposing an end of the touch signal layer.

According to an embodiment of the present invention, the plurality of touch driving wires each include a first touch driving wire and a second touch driving wire which are connected to different first touch electrodes, and a pad connection line connected to the first touch driving wire at least partially overlaps the second routing line of the second touch driving wire.

According to an embodiment of the present invention, the pad connection line connected to the first touch driving wire further includes a third region overlapping the second routing line of the second touch driving wire, and a width of the fourth region in the first direction is greater than a width of the third region in the first direction.

According to an embodiment of the present invention, a display device is provided including a display unit including a display region which includes a plurality of pixels and a touch unit including a touch sensor region which at least partially overlaps the display region. The touch unit includes a plurality of first touch electrodes disposed in the touch sensor region, a plurality of touch driving wires electrically connected to the plurality of first touch electrodes, a plurality of pad electrode lines spaced apart from the plurality of touch driving wires and connected to a plurality of pads, and a plurality of pad connection lines connected to the plurality of touch driving wires and the plurality of pad electrode lines. The plurality of pad connection lines are disposed below the plurality of touch driving wires.

The plurality of touch driving wires each include a first routing line connected to a first side of the plurality of first touch electrodes and a second routing line branched from the first routing line and connected to a second side of the plurality of first touch electrodes. An area in which each pad connection line of the plurality of pad connection lines is in contact with the first routing line is different from an area in which each pad connection line of the plurality of pad connection lines is in contact with a pad electrode line of the plurality of pad electrode lines.

According to an embodiment of the present invention, a plurality of second touch electrodes are disposed between the plurality of first touch electrodes within the touch sensor region and connected to the plurality of touch sensing wires at a first side of the touch sensor region. A first guard line is disposed between an outermost touch sensing wire and a first ground line at the first side of the touch unit. A second guard line is interposed between an innermost second routing line and the first routing line at a second side of the touch sensor region, and between a third side of the touch sensor region and the innermost second routing line. A third guard line is interposed between an outermost first routing line and an innermost touch sensing wire at a corner defined between the first and second side of the touch sensor region. A fourth guard line is interposed between an outermost second routing line and a second ground line at a fourth side of the touch sensor region.

BRIEF DESCRIPTION OF THE DRAWINGS

The above and other aspects and features of the present disclosure will become more apparent by describing embodiments thereof in detail with reference to the attached drawings, in which.

DETAILED DESCRIPTION OF THE EMBODIMENTS

Hereinafter, the present invention will be described more fully with reference to the accompanying drawings in which various embodiments are shown.

Like numerals may refer to like elements throughout the following description and corresponding figures. In the figures, the thickness, ratio, and dimension of components may be exaggerated for effective illustration of the technical content. However, the present invention is not limited thereto. It will also be understood that when a layer is referred to as being "on" another layer or substrate, it can be directly on the other layer or substrate, or intervening layers may also be present.

Hereinafter, embodiments of the present invention will be described with reference to the accompanying drawings.

Figure 1:
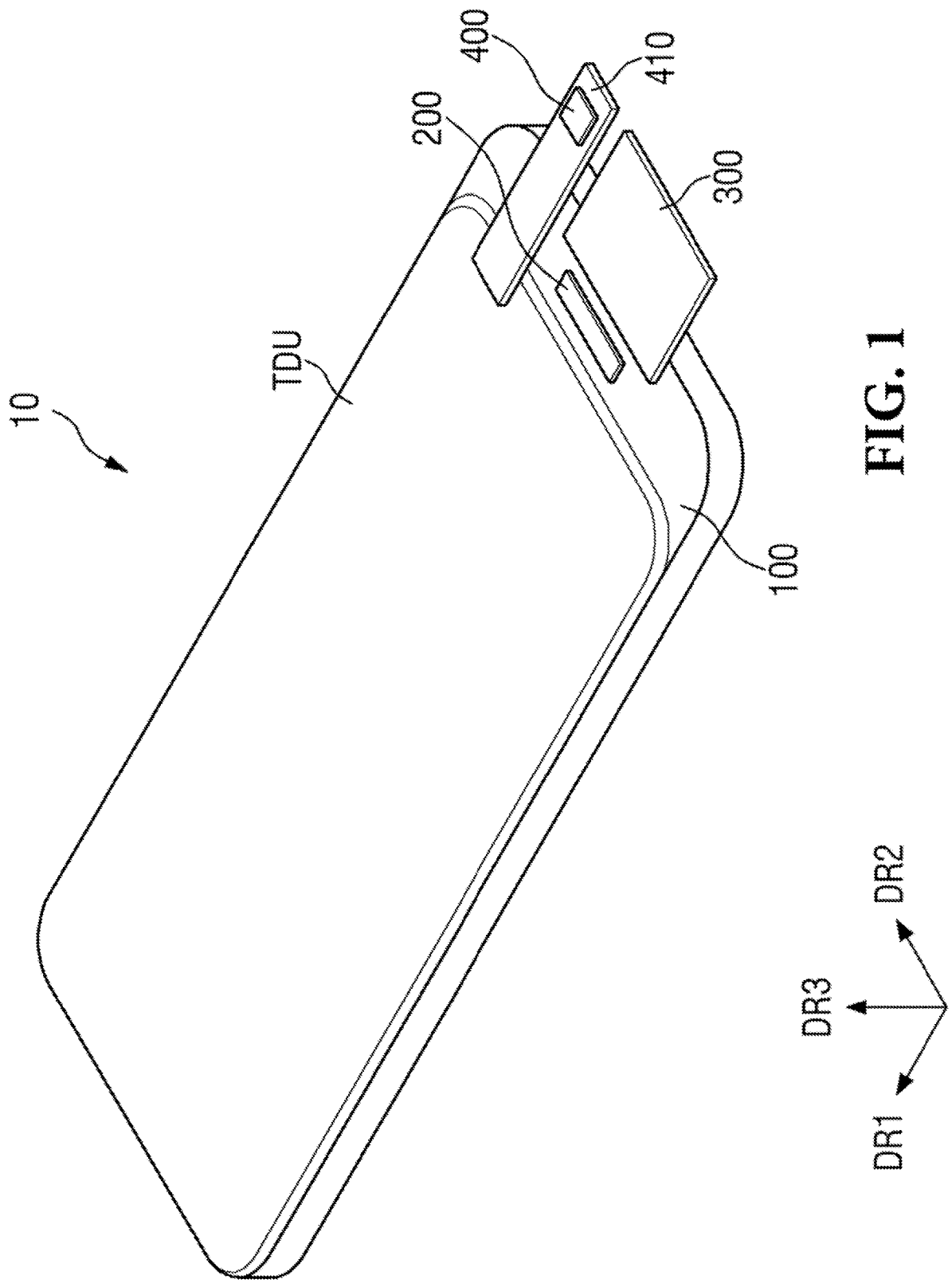
FIG. 1 is a perspective view illustrating a display device according to an embodiment of the present invention.
Figure 2:
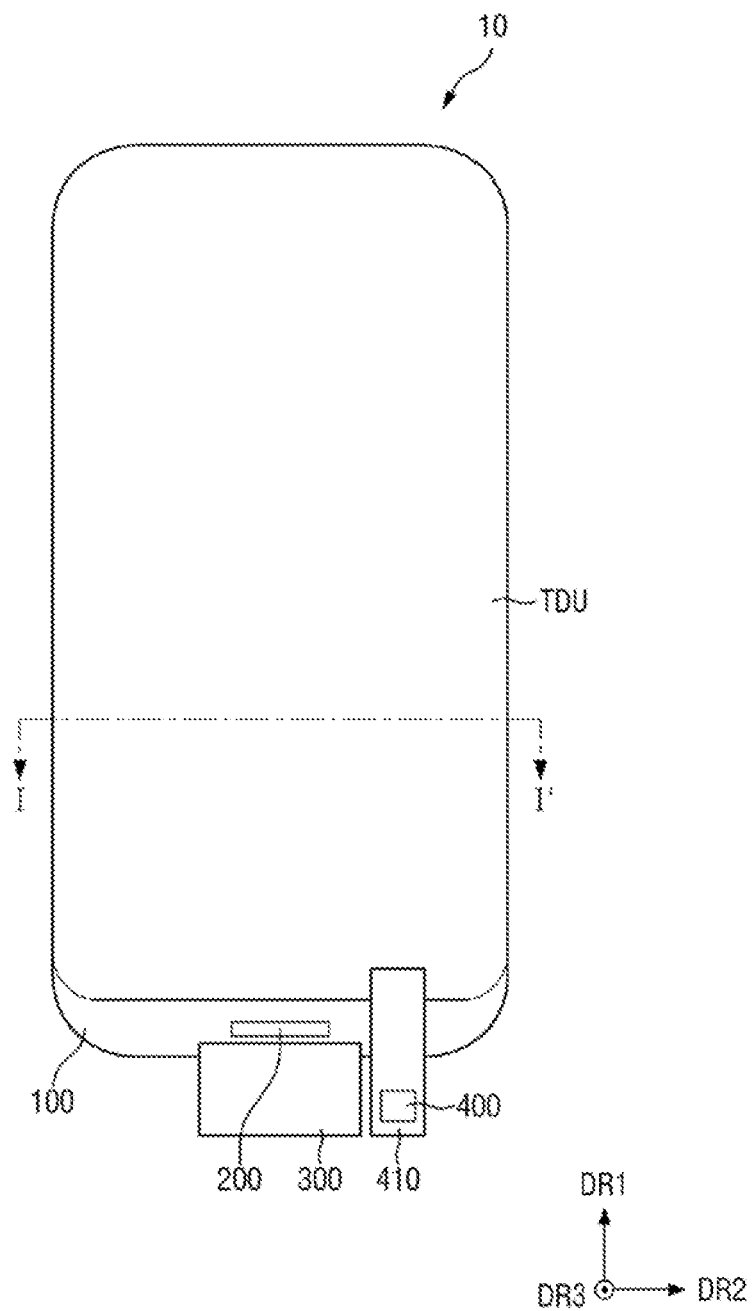
FIG. 2 is a plan view illustrating the display device of FIG. 1 according to an embodiment of the present invention.

FIG. 1 is a perspective view illustrating a display device 10 according to an embodiment of the present invention. FIG. 2 is a plan view illustrating the display device of FIG. 1 according to an embodiment of the present invention.

A first direction (e.g., a DR1 direction) may also be referred to herein as a Y-axis direction, a second direction (e.g., a DR2 direction) may also be referred to herein as an X-axis direction, and a third direction (e.g., a DR3 direction) may also be referred to herein as a Z-axis direction.

Referring to FIGS. 1 and 2, a display device 10 is a device which displays a still image or a moving image. The display device 10 may be used in portable electronic devices such as a mobile phone, a smartphone, a tablet personal computer (PC), a smart watch, a watch phone, a mobile communication terminal, an electronic notebook, an electronic book, a portable multimedia player (PMP), a navigation device, an ultra mobile PC (UMPC) and may also be used as a display screen of various products such as a television, a laptop computer, a monitor, a billboard, and a device for Internet of Things (IoT). The display device 10 may be anyone of an organic light-emitting display device, a liquid crystal display device, a plasma display device, a field emission display device, an electrophoretic display device, an electro-wetting display device, a quantum dot light-emitting display device, and a micro light-emitting diode (LED) display device. Hereinafter, it will mainly be described that the display device 10 is the organic light-emitting display device, but the present invention is not limited thereto.

The display device 10 according to an embodiment of the present invention includes a display panel 100, a display driving circuit 200, a display circuit board 300, a touch driving circuit 400, a touch circuit board 410, and a touch unit TDU.

A top view of the display panel 100 may have a substantially rectangular shape which has a long side extending in the first direction (e.g., the DR1 direction) and a short side extending in the second direction (e.g., the DR2 direction) intersecting with the first direction (e.g., the DR1 direction). A corner at which the long side extending in the first direction (e.g., the DR1 direction) meets the short side extending in the second direction (e.g., the DR2 direction) may be rounded to have a certain curvature or formed at a right angle. The shape of the top view of the display device 10 is not limited to the rectangular shape but may be formed in another polygonal, circular, or elliptical shape. The display panel 100 may have a flat upper surface. However, the present invention is not limited thereto, and the display device may include curved portions disposed at left and right ends thereof. In this case, the curved portion may have a constant curvature or have a variable curvature. In addition, the display panel 100 may be curved or bent.

The display panel 100 may include pixels which are disposed in a display region and display images and display electrode pads which are disposed in a non-display region disposed around the display region. The display electrode pads may be disposed on the display panel 100 at one side edge of the display panel 100 and may be electrically connected to the display circuit board 300. The display panel 100 will be described in detail below with reference to FIGS. 3 and 4.

The display driving circuit 200 outputs signals and voltages for driving the display panel 100. For example, the display driving circuit 200 may supply data voltages to data lines. In addition, the display driving circuit 200 may supply a power voltage to a power line and may supply scan control signals to a scan driver. The display driving circuit 200 may be formed as an integrated circuit (IC) and may be attached on the display panel 100 through a chip-on-glass (COG) method, a chip-on-plastic (COP) method, or an ultrasonic bonding method. The display driving circuit 200 may be attached to the display panel 100 which is not covered by the touch unit TDU and is exposed. For example, the display driving circuit 200 may extend across a short side of the display panel 100 in the second direction (e.g., the DR2 direction) and may be disposed between the display circuit board 300 and the TDU. Alternatively, the display driving circuit 200 may be mounted on the circuit board 300.

The display circuit board 300 may be attached on the display electrode pads of the display panel 100 using an anisotropic conductive film. For example, the display circuit board 300 may at least partially overlap a short side of the display panel 100. Accordingly, lead lines of the display circuit board 300 may be electrically connected to the display electrode pads of the display panel 100. The display circuit board 300 may be a flexible film such as a flexible printed circuit board, a printed circuit board, or a chip-on film.

The touch unit TDU may be disposed on the display panel 100. In a plan view, the touch unit TDU may have a substantially rectangular shape which has a long side extending in the first direction (e.g., the DR1 direction) and a short side extending in the second direction (e.g., the DR2 direction). A corner at which the long side in the first direction (e.g., the DR direction) meets the short side in the second direction (e.g., the DR2 direction) may be rounded to have a certain curvature or formed at a right angle. The shape of the top view of the touch unit TDU is not limited to the rectangular shape but may be formed in another polygonal, circular, or elliptical shape. The shape of the top view of the touch unit TDU may be similar to the shape of the top view of the display panel 100.

The touch unit TDU may be disposed to be flat. However, the present invention is not limited thereto, and the touch unit TDU may include curved portions disposed at left and right ends thereof. In this case, the curved portion may have a constant curvature or have a variable curvature. Furthermore, the touch unit TDU may be curved or bent like the display panel 100.

The touch unit TDU may include touch electrodes which are disposed in a touch sensor region and may sense a touch of a user, and touch electrode pads which are disposed in a touch peripheral region disposed at a periphery of the touch sensor region. The touch electrode pads may be disposed on the touch unit TDU at one side edge of the touch unit TDU and may be electrically connected to the touch circuit board 410. The touch unit TDU may be described in detail below with reference to FIGS. 3 and 5.

The touch circuit board 410 may be attached on the touch electrode pads of the touch unit TDU using an anisotropic conductive film. Accordingly, lead lines of the touch circuit board 410 may be electrically connected to the touch electrode pads of the touch unit TDU. The touch circuit board 410 may be a flexible film such as a flexible printed circuit board, a printed circuit board, or a chip-on film.

The touch driving circuit 400 may be connected to the touch electrodes of the touch unit TDU. For example, the touch driving circuit 400 may extend in the first direction (e.g., the DR1 direction) from a short side of the touch unit TDU beyond a short side of the display panel 100. The touch driving circuit 400 applies touch driving signals to the touch electrodes of the touch unit TDU and measures capacitance values of the touch electrodes. The touch driving signal may be a signal having a plurality of driving pulses. The touch driving circuit 400 may determine whether a touch is input based on the capacitance values and may also calculate touch coordinates at which the touch is input. The touch driving circuit 400 may be formed as an integrated circuit (IC) and mounted on the touch circuit board 410.

Figure 3:
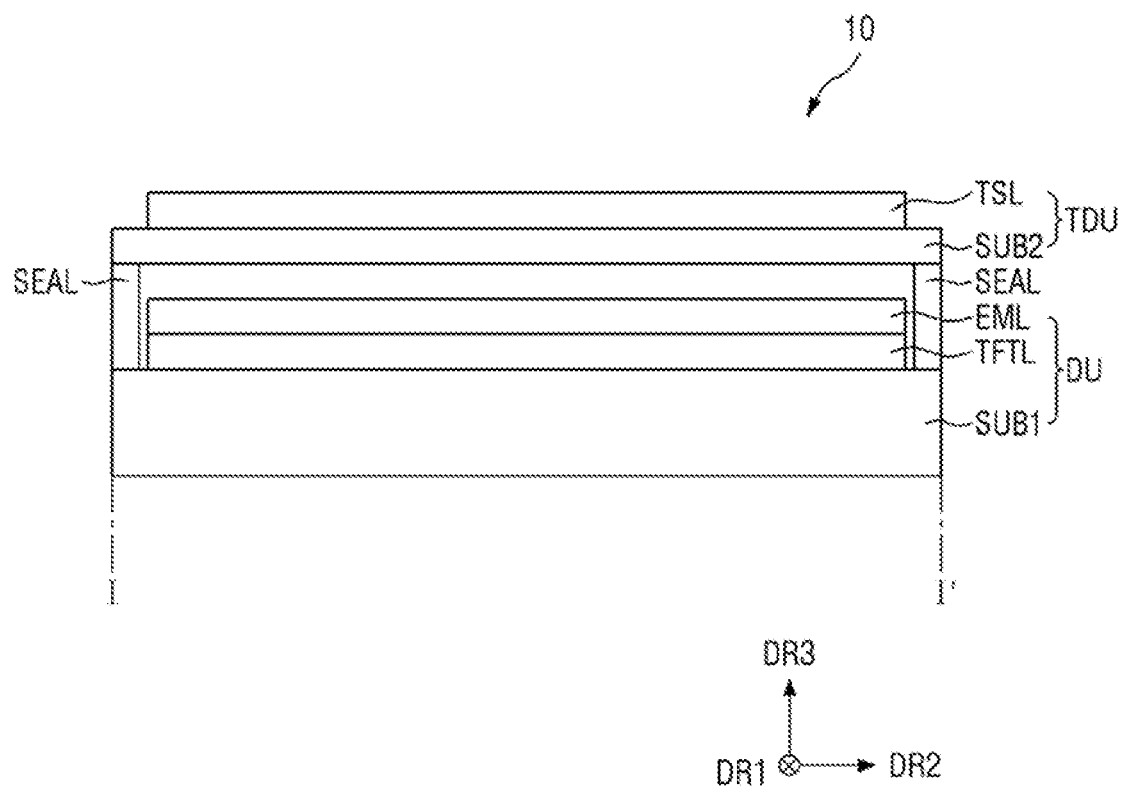
FIG. 3 is a cross-sectional view illustrating a cross-section taken along line I-I' of FIG. 2 according to an embodiment of the present invention.

FIG. 3 is a cross-sectional view taken along line I-I' of FIG. 2.

Referring to FIG. 3, the display device 10 may include a display unit DU, the touch unit TDU, and an adhesive member SEAL for bonding the display unit DU and the touch unit TDU.

The display unit DU may include a first substrate SUB1, a thin film transistor layer TFTL, and a light-emitting element layer EML.

The first substrate SUB1 may include a rigid substrate and/or a flexible substrate which is bendable, foldable, and rollable. The first substrate SUB1 may include an insulating material such as glass, quartz, and/or a polymer resin. Examples of a polymeric material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyarylate, polyimide (PI), polycarbonate (PC), cellulose triacetate (CAT), and/or cellulose acetate propionate (CAP). Alternatively, the first substrate SUB1 may include a metal material.

The thin film transistor layer TFTL may be disposed on the first substrate SUB1. Not only the thin film transistor of each pixel but also scan lines, data lines, power lines, scan control lines, data connection lines for connecting the display driving circuit 200 and the data lines, and pad connection lines for connecting the display driving circuit 200 and the display electrode pads may be disposed on the film transistor layer TFTL. Each of the thin film transistors may include a gate electrode, a semiconductor layer, a source electrode, and a drain electrode. This will be described in detail below.

The light-emitting element layer EML may be disposed on the thin film transistor layer TFTL. The light-emitting element layer EML may include the pixels in which a first electrode, a light-emitting layer, and a second electrode are sequentially stacked to emit light and a pixel definition film which defines the pixels. The pixels of the light-emitting element layer EML may be disposed in the display region.

The light-emitting layer may be an organic light-emitting layer including an organic material. In this case, the light-emitting layer may include a hole transporting layer, an organic light-emitting layer, and an electron transporting layer. When a certain voltage is applied to the first electrode through the thin film transistor of the thin film transistor layer TFTL and a cathode voltage is applied to the second electrode, holes and electrons are moved to the organic light-emitting layer through the hole transporting layer and the electron transporting layer and are combined with each other in the light-emitting layer to emit light. In this case, the first electrode may be an anode electrode, and the second electrode may be a cathode electrode.

The touch unit TDU may include a second substrate SUB2 and a touch sensor layer TSL.

The second substrate SUB2 may include a rigid substrate and/or a flexible substrate which is bendable, foldable, and rollable. The second substrate SUB2 may be made of an insulating material such as glass, quartz, and/or a polymer resin. Examples of a polymeric material may be one selected from PES, PA, PAR, PEI, PEN, PET, PPS, PI, PC, CAT, and/or CAP. Alternatively, the second substrate SUB2 may include a metal material. In addition, the second substrate SUB2 may serve as an encapsulation substrate configured to seal the light-emitting element layer EML.

The touch sensor layer TSL may be disposed on the second substrate SUB2. The touch sensor layer TSL may include touch electrodes for sensing a touch of a user using a capacitance method, touch electrode pads, and touch signal lines for connecting the touch electrode pads and the touch electrodes. For example, the touch sensor layer TSL may sense a touch of a user using a self-capacitance method or a mutual capacitance method. This will be described in detail below.

A polarizing film and a cover window may be additionally disposed above the touch sensor layer TSL. In this case, the polarizing film may be disposed on the touch sensor layer TSL, and the cover window may be attached on the polarizing film through a transparent adhesive member.

The adhesive member SEAL may bond the first substrate SUB1 of the display unit DU and the second substrate SUB2 of the touch unit TDU. The adhesive member SEAL may include a frit adhesive layer, an ultraviolet curable resin, and/or a thermosetting resin, but the present invention is not limited thereto. For example, the adhesive member SEAL may extend from the first substrate SUB1 to the second substrate SUB2 in the third direction (e.g., the DR3 direction) in which an upper surface contacts the second substrate SUB2 and a lower surface contacts the first substrate SUB1. The adhesive members SEAL may be spaced in the second direction (e.g., the DR2 direction) to overlap edge portions of the first substrate SUB1 and the second substrate SUB2.

FIG. 3 illustrates that an empty space is formed between the light-emitting element layer EML and the second substrate SUB2 and the adhesive member SEAL, but embodiments of the present invention are not limited thereto. For example, a filling film may be disposed between the light-emitting element layer EML and the second substrate SUB2. The filling film may include an epoxy filling film and/or a silicon filling film.

Figure 4:
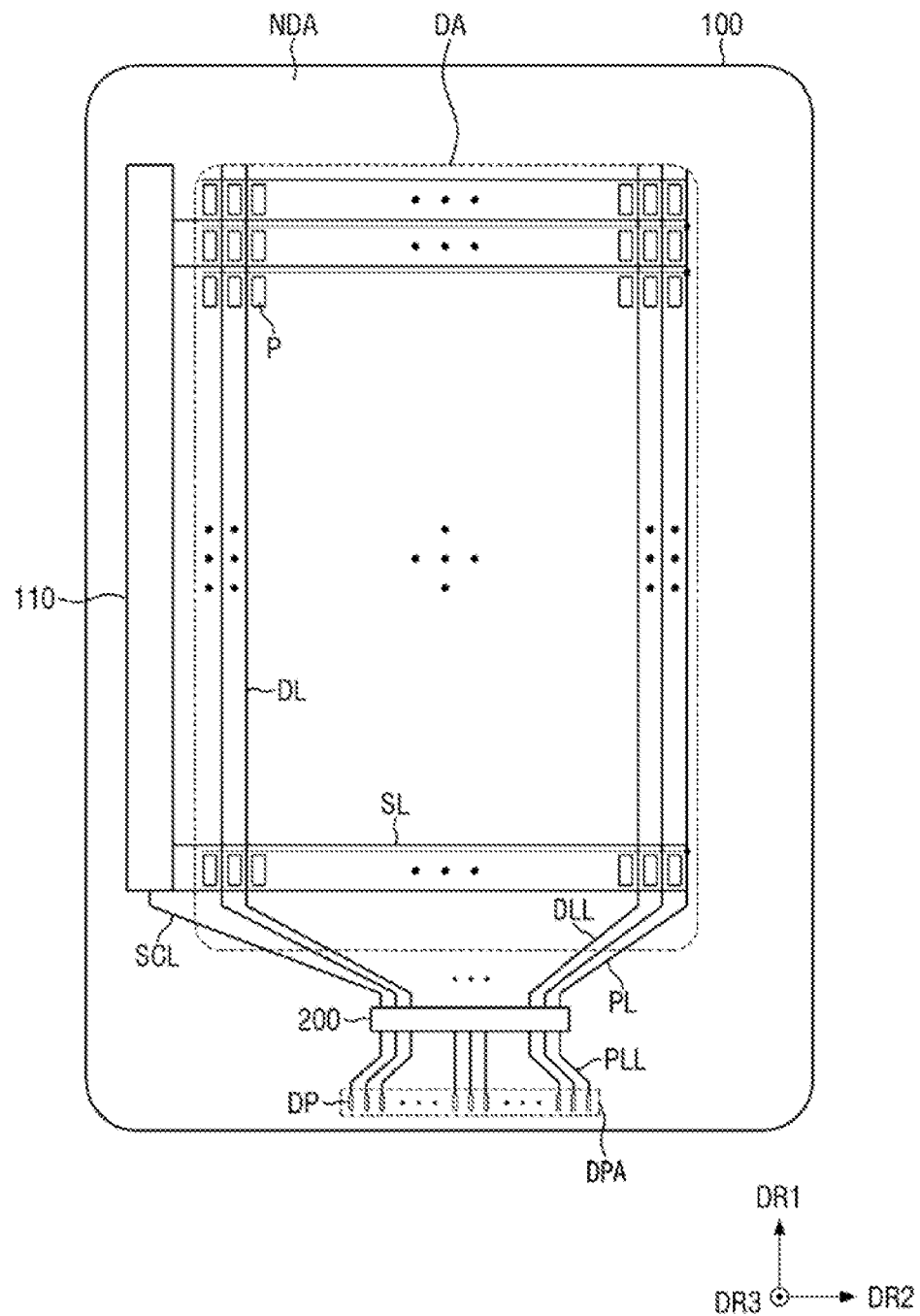
FIG. 4 is a plan view illustrating a display unit of FIG. 3 according to an embodiment of the present invention.

FIG. 4 is a plan view illustrating the display unit DU of FIG. 3.

For convenience of description, only pixels P, scan lines SL, data lines DL, a power line PL, scan control lines SCL, the scan driver 110, the display driving circuit 200, display electrode pads DP, data connection lines DLL, and pad connection lines PLL of the display unit DU are shown in FIG. 4.

Referring to FIG. 4, the display panel 100 may include a display region DA in which the pixels are formed to display an image and a non-display region NDA which is a peripheral region of the display region DA. The non-display region NDA may be defined as a region from an outermost portion of the display region DA to an edge of the display panel 100.

The scan lines SL, the data lines DL, the power line PL, and the pixels P may be-disposed in the display region DA. The scan lines SL may be disposed in parallel extending in the second direction (e.g., the DR2 direction) and spaced in the first direction (e.g., the DR1 direction), and the data lines DL may be disposed in parallel in the first direction (e.g., the DR1 direction) intersecting with the second direction (e.g., the DR2 direction). The power line PL may include at least one line disposed parallel to the data lines DL in the first direction (e.g., the DR1 direction) and a plurality of lines branched from the at least one line in the second direction (e.g., the DR2 direction).

Each of the pixels P may be connected to at least one of the scan lines SL, any one of the data lines DL, and the power line PL. Each of the pixels P may include thin film transistors including a driving transistor and at least one switching transistor, an organic light-emitting diode, and a capacitor. When a scan signal is applied from the scan line SL, each of the pixels P may receive a data voltage of the data line DL and may supply a driving current to the organic light-emitting diode in response to the data voltage to emit light applied to the gate electrode.

The scan driver 110, the display driving circuit 200, the scan control lines SCL, the data connection lines DLL, and the pad connection lines PLL may be disposed in the non-display region NDA.

The scan driver 110 is connected to the display driving circuit 200 through at least one scan control line SCL. Therefore, the scan driver 110 may receive the scan control signals of the display driving circuit 200. The scan driver 110 generates scan signals in response to the scan control signals and supplies the scan signals to the scan lines SL.

The scan driver 110 is illustrated in FIG. 4 as being disposed in the non-display region NDA outside one side of the display region DA, but the present invention is not limited thereto. For example, the scan driver 110 may be disposed in the non-display region NDA adjacent to a long side of the display region DA extending in the first direction (e.g., the DR1 direction).

The display driving circuit 200 is connected to the display electrode pads DP of a display pad region DPA through the pad connection lines PLL and receives digital video data and timing signals. The display driving circuit 200 converts the digital video data into analog positive/negative data voltages and supplies the analog positive/negative data voltages to the data lines DL through the data connection lines DLL. Furthermore, the display driving circuit 200 generates and supplies the scan control signals for controlling the scan driver 110 through the scan control line SCL. The pixels P to which the data voltages are supplied are selected by the scan signals of the scan driver 110, and the data voltages are supplied to the selected pixels P. The display driving circuit 200 may be formed as an IC and may be attached on the substrate through a COG method, a COP method, or an ultrasonic bonding method.

Figure 5:
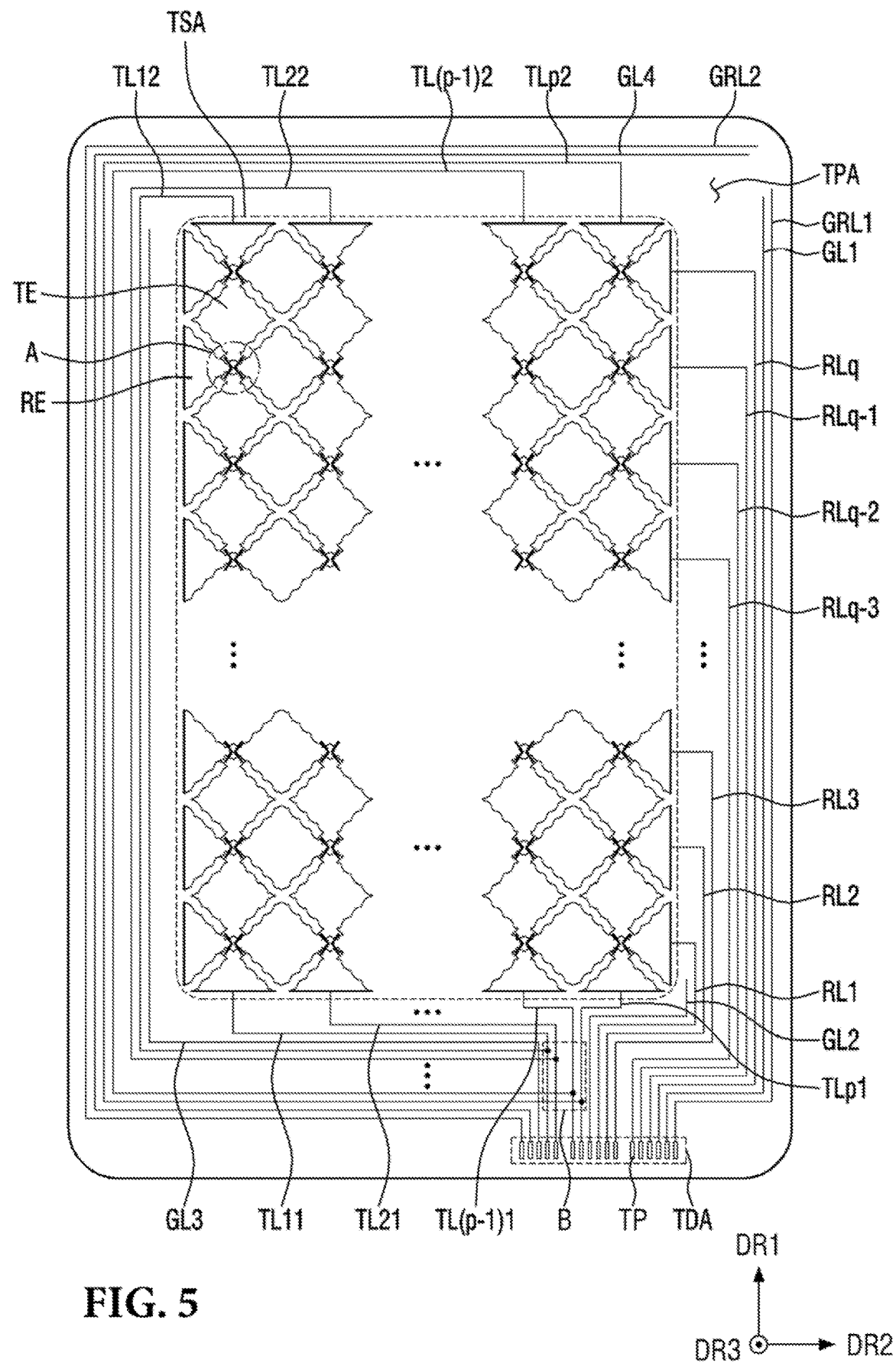
FIG. 5 is a plan view illustrating a touch unit of FIG. 3 according to an embodiment of the present invention.

FIG. 5 is a plan view illustrating the touch unit TDU of FIG. 3. Referring to FIG. 5, the touch unit TDU includes a touch sensor region TSA for sensing a touch of a user and a touch peripheral region TPA disposed at a periphery of the touch sensor region TSA. The touch sensor region TSA may overlap the display region DA of the display unit DU, and the touch peripheral region TPA may overlap the non-display region NDA of the display unit DU in the third direction (e.g., the DR3 direction). For example, the touch peripheral region TPA may have a shape that corresponds to a shape of the non-display region NDA of the display unit DU, and the touch sensor region TSA may have a shape that corresponds to a shape of the display region DA.

First touch electrodes TE and second touch electrodes RE may be disposed in the touch sensor region TSA. The first touch electrodes TE and the second touch electrodes RE may have a diamond or triangular shape in a plan view. Specifically, the first touch electrodes TE and the second touch electrodes RE disposed at edges of the touch sensor region TSA may have a triangular shape in a plan view, and other first touch electrodes TE and second touch electrodes RE may have a diamond shape in a plan view. In order to prevent a moiré phenomenon from being caused by the first touch electrodes TE and the second touch electrodes RE when an image of the display device 10 is viewed, the first touch electrode TE and the second touch electrode RE may have uneven sides in a plan view. However, planar shapes of the first touch electrode TE and the second touch electrode RE are not limited to those shown in FIG. 5.

The first touch electrodes TE and the second touch electrodes RE may be disposed to be spaced apart from each other. The first touch electrodes TE may be disposed in a plurality of columns in the first direction (e.g., the DR direction), and the second touch electrodes RE may be disposed in a plurality of rows in the second direction (e.g., the DR2 direction). The first touch electrodes TE disposed in each of the plurality of columns in the first direction (e.g., the DR1 direction) may be electrically connected. In addition, the second touch electrodes RE disposed in each of the plurality of rows in the second direction (e.g., the DR2 direction) may be electrically connected.

In order to prevent the first touch electrodes TE and the second touch electrodes RE from being short-circuited to each other in intersection regions thereof, the first touch electrodes TE adjacent to each other in the first direction (e.g., the DR direction) may be electrically connected through a connection electrode CE. The connection electrode CE may extend in an oblique direction to the first direction (e.g., the DR1 direction) and the second direction (e.g., the DR2 direction). The first touch electrode TE and the second touch electrode RE may be disposed in one layer, and the connection electrode CE may be disposed in a layer different from the first touch electrode TE and the second touch electrode RE. As a result, the first touch electrodes TE electrically connected in the first direction (e.g., the DR1 direction) and the second touch electrodes RE electrically connected in the second direction (e.g., the DR2 direction) are electrically insulated from each other.

The first touch electrodes TE and the second touch electrodes RE may be driven through a mutual capacitance method or a self-capacitance method.

When the first touch electrodes TE and the second touch electrodes RE are driven through the mutual capacitance method, touch driving signals may be supplied to the first touch electrodes TE through touch driving wires TL1 to TLp to charge mutual capacitances formed in the intersection regions between the first touch electrodes TE and the second touch electrodes RE. Then, charge change amounts of the mutual capacitances are measured through the second touch electrodes RE, and whether a touch is input is determined according to the charge change amounts of the mutual capacitances. The touch driving signal may be a signal having a plurality of touch driving pulses.

In addition, when the first touch electrodes TE and the second touch electrodes RE are driven through the self-capacitance method, touch driving signals may be supplied to all of the first touch electrodes TE and the second touch electrodes RE through the touch driving wires TL1 to TLp and touch sensing wires RL1 to RLq to charge self-capacitances of the first touch electrodes TE and the second touch electrodes RE. Then, charge change amounts of the self-capacitances are measured through the touch driving wires TL1 to TLp and the touch sensing wires RL1 to RLq, and whether a touch is input is determined according to the charge change amounts of the self-capacitances.

Hereinafter, for convenience of description, it will mainly be described that the first touch electrodes TE and the second touch electrodes RE are driven through the mutual capacitance method in which a plurality of touch driving pulses are applied to the first touch electrodes TE and charge change amounts of mutual capacitances are measured through the touch sensing wires RL1 to RLq connected to the second touch electrodes RE.

The touch driving wires TL1 to TLp (wherein p is a positive integer of two or more), the touch sensing wires RL1 to RLq (wherein q is a positive integer of two or more) and the touch electrode pads TP may be disposed in the touch peripheral region TPA.

The touch driving wires TL1 to TLp may be connected to the first touch electrodes TE. For example, a first driving wire TL1 may be electrically connected to the first touch electrode TE disposed in a first column of the touch sensor region TSA, and a second touch driving wire TL2 may be electrically connected to the first touch electrode TE disposed in a second column. In addition, a $p^{th}$ touch driving wire TLp may be electrically connected to the first touch electrode TE disposed in a pth column.

The touch driving wires TL1 to TLp (wherein p is a positive integer of two or more) may include first routing lines TL11 to TLp1 and second routing lines TL12 to TLp2.

First ends of the first routing lines TL11 to TLp1 (wherein p is a positive integer of two or more) of the touch driving wires TL1 to TLp may be connected to the first touch electrodes TE disposed at a first side of the touch sensor region TSA (e.g., a short side). The first side of the touch sensor region TSA may refer to a side among the four sides thereof that is nearest to the touch pad region TDA in which the touch electrode pads TP are disposed. The second ends of the first routing lines TL11 to TLp1 opposite to the first ends may be connected to corresponding ones of the touch electrode pads TP of the touch pad region TDA. For example, the first routing lines TL11 to TLp1 may connect the first touch electrodes TE disposed at the first side of the touch sensor region TSA with respective touch electrode pads TP of the touch pad region TDA.

For example, as shown in FIG. 5, the first routing line TL11 of the first touch driving wire TL1 may be electrically connected to the first touch electrode TE disposed in the first column of the touch sensor region TSA. The first routing line TL21 of the second touch driving wire TL2 may be electrically connected to the first touch electrode TE in the second column of the touch sensor region TSA. In addition, the first routing line TLp1 of the $p^{th}$ touch driving wire TLp may be electrically connected to the first touch electrode TE disposed in the $p^{th}$ column of the touch sensor region TSA. In this case, the first column of the touch sensor region TSA may be a column disposed at the leftmost side of the touch sensor region TSA, and the $p^{th}$ column of the touch sensor region TSA may be a column disposed at the rightmost side of the touch sensor region TSA.

First ends of the second routing lines TL12 to TLp2 of the touch driving wires TL1 to TLp may be connected to the first touch electrodes TE disposed at a second side of the touch sensor region TSA. The second side of the touch sensor region TSA may be a side opposite to the first side of the touch sensor region TSA. The second ends of the second routing lines TL12 to TLp2 may be connected to the touch electrode pads TP of the touch pad region TDA. For example, the second routing lines TL12 to TLp2 may connect the first touch electrodes TE disposed at the second side of the touch sensor region TSA and the touch electrode pads TP of the touch pad region TDA.

For example, as shown in FIG. 5, the second routing line TL12 of the first touch driving wire TL1 may be electrically connected to the first touch electrode TE disposed in the first column of the touch sensor region TSA. The second routing line TL22 of the second touch driving wire TL2 may be electrically connected to the first touch electrode TE in the second column of the touch sensor region TSA. In addition, the second routing line TLp2 of the $p^{th}$ touch driving wire TLp may be electrically connected to the first touch electrode TE disposed in the $p^{th}$ column of the touch sensor region TSA.

The second routing lines TL12 to TLp2 of the touch driving wires TL1 to TLp may be branched from the first routing lines TL11 to TLp1, and may pass outside the first side and a fourth side (e.g., a leftmost long side) of the touch sensor region TSA, and may be connected to the first touch electrodes TE disposed at the second side of the touch sensor region TSA.

For example, as shown in FIG. 5, the second routing line TL12 of the first touch driving wire TL1 may be branched from the first routing line TL11, and the second routing line TL22 of the second touch driving wire TL2 may be branched from the first routing line TL21. In addition, the second routing line TLp2 of the $p^{th}$ touch driving wire TLp may be branched from the first routing line TLp1.

First ends of the touch sensing wires RL1 to RLq may be connected to the second touch electrodes RE disposed at a third side (e.g., a rightmost long side) of the touch sensor region TSA. The third side of the touch sensor region TSA may be a side opposite to the fourth side of the touch sensor region TSA. The second ends of the touch sensing wires RL1 to RLq may be connected to the remaining touch electrode pads TP of the touch pad region TDA. For example, the touch sensing wires RL1 to RLq may connect the second touch electrodes RE disposed at the third side of the touch sensor region TSA and the remaining touch electrode pads TP of the touch pad region TDA.

For example, as shown in FIG. 5, a first touch sensing wire RL1 may be electrically connected to the second touch electrode RE disposed in a first row of the touch sensor region TSA. The second touch sensing wire RL2 may be electrically connected to the second touch electrode RE disposed in a second row of the touch sensor region TSA. In addition, a $q^{th}$ touch sensing wire RLq may be electrically connected to the second touch electrode RE disposed in a $q^{th}$ row. For example, the second touch electrodes RE connected to respective first touch sensing wires RL may be outermost second touch electrodes RE of each row at the third side of the touch sensor region TSA.

The touch electrode pads TP may be disposed at a first side of the touch peripheral region TPA. The touch circuit board 410 may be attached on the touch electrode pads TP using an anisotropic conductive film. Accordingly, the touch electrode pads TP may be electrically connected to the touch circuit board 410. The touch electrode pads TP may be connected to the touch driving wires TL1 to TLp through pad electrode lines PEL. This will be described in detail below with reference to FIGS. 8 to 10.

A first guard line GL1, a second guard line GL2, a third guard line GL3, a first ground line GRL1, and a second ground line GRL2 may be disposed in the touch peripheral region TPA. The guard lines GL and ground lines GRL may be formed as an opaque metal conductive layer, for example, a single layer or a multi-layer including molybdenum (Mo), aluminum (Al), chromium (Cr), gold (Au), titanium (Ti), nickel (Ni), neodymium (Nd), and/or copper (Cu).

The first guard line GL1 may be disposed outside a $q^{th}$ touch sensing wire RLq which is an outermost touch sensing wire RL in the second direction (e.g., the DR2 direction). In addition, the first ground line GRL1 may be disposed outside the first guard line GL1. For example, the first guard line GL1 is disposed between the first round line GRL1 and the $q^{th}$ touch sensing wire RLq disposed as an outermost touch sensing wire RL, the first guide line GL1 may minimize the $q^{th}$ sensing line RLq being influenced by a change in voltage of the first ground line GRL1. A first end of the first guard line GL1 and a first end of the first ground line GRL1 may be connected to the touch electrode pads disposed at a rightmost side. For example, the first guard line GL1 may be interposed between the outermost touch sensing wire RLq and the first ground line GRL1 from the touch pad region TDA across a third side of the touch sensor region TSA.

The second guard line GL2 may be disposed between the first routing line TLp1 of the $p^{th}$ touch driving wire TLp and the first touch sensing wire RL1 disposed as an innermost side among the touch sensing wires RL1 to RLq. Thus, the second guard line GL2 may minimize the first touch sensing wire RL1 and the first routing line TLp1 of the $p^{th}$ touch driving wire TLp being influenced by each other. A first end of the second guard line GL2 may be connected to the touch electrode pad TP. For example, the second guard line GL2 may be interposed between the first routing line TLp1 and the first touch sensing wire RL1 from the touch pad region TDA across an edge portion defined by the first side and the second side of the touch sensor region TSA.

The third guard line GL3 may be disposed between the first routing line TL1 and the second routing line TL12 of the first touch driving wire TL1. For example, the third guard line GL3 may have a first portion interposed between the first routing line TL11 and the second routing line TL12 beginning at point adjacent to a branching point of the first routing line TL11 and the second routing line TL12, and may extend across the first side of the touch sensor region TSA in the second direction (e.g., the DR2 direction) in parallel to the first routing line TL11 and the second routing line TL12. A second portion of the third guard line GL3 may extend from the first portion in the first direction (e.g., the DR1 direction) across the fourth side of the touch sensor region TSA and may be disposed between the fourth side of the touch sensor region TSA and the second routing line TL12. The third guard line GL3 may minimize the first routing line TL11 and the second routing line TL12 being influenced by each other. One end of the third guard line GL3 may be connected to the touch electrode pad TP.

The fourth guard line GL4 may be disposed outside a second routing line TLp2 disposed as an outermost second routing line from among the second routing lines TL12 to TLp2 of the touch driving wires TL1 to TLp. In addition, the second ground line GRL2 may be disposed outside the fourth guard line GL4. For example, the fourth guard line GL4 is disposed between the second ground line GRL2 and the second routing line TLp2 disposed as an outermost second routing line from among the second routing lines TL12 to TLp2, the fourth guide line GL4, and may minimize the second routing line TLp2 being influenced by a change in voltage of the second ground line GRL2. A first end of the fourth guard line GL4 and a first end of the second ground line GRL2 may be connected to the touch electrode pads disposed at a first side of the touch sensor region TSA. For example, the fourth guard line GL4 and the second ground line GRL2 may extend from the touch pad region TDA around the first side, the fourth side, and the second side of the touch sensor region TSA.

The first ground line GRL1 is disposed at an outermost side of a right side of the touch unit TDU, and the second ground line GRL2 is disposed at outermost sides of lower, left, and upper sides of the touch unit TDU. A ground voltage is applied to the first ground line GRL1 and the second ground line GRL2. When static electricity is introduced from the outside, the static electricity may be discharged to the first ground line GRL1 and the second ground line GRL2.

Meanwhile, when the first touch electrodes TE and the second touch electrodes RE are driven through the mutual capacitance method, a ground voltage may be applied to the first guard line GL1, the second guard line GL2, the third guard line GL3, and the fourth guard line GL4.

According to the embodiment of the present invention of FIG. 5, the second routing lines TL12 to TLp2 of the touch driving wires TL1 to TLp are branched from the first routing lines TL11 to TLp1. Touch driving signals may be applied to the first touch electrodes TE disposed at the first side and the second side of the touch sensor region TSA using the first routing lines TL11 to TLp1 and the second routing lines TL12 to TLp2. Therefore, the touch driving signals may be stably applied to the first touch electrodes TE.

Hereinafter, the touch sensor region TSA will be described in more detail.

Figure 6:
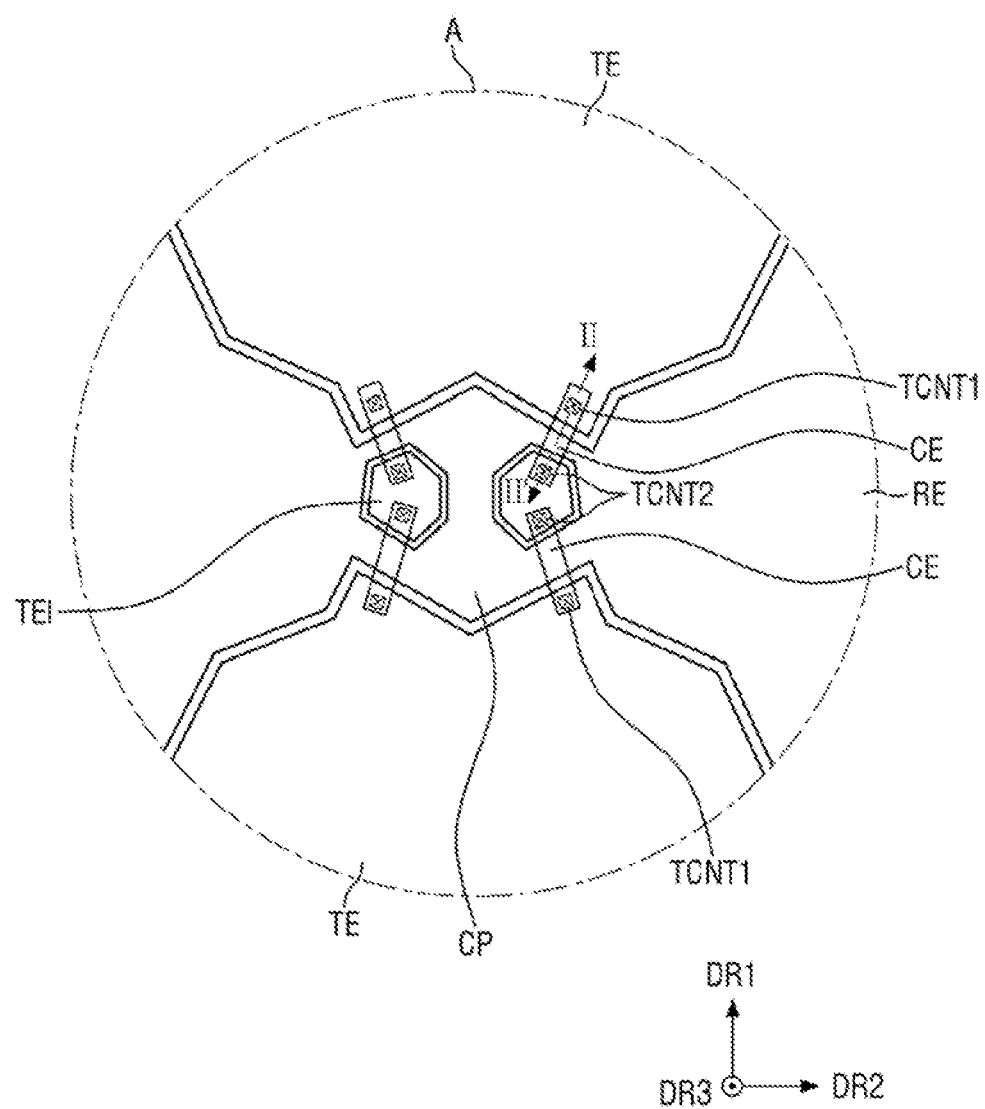
FIG. 6 is a plan view illustrating region A of FIG. 5 according to an embodiment of the present invention.
Figure 7:
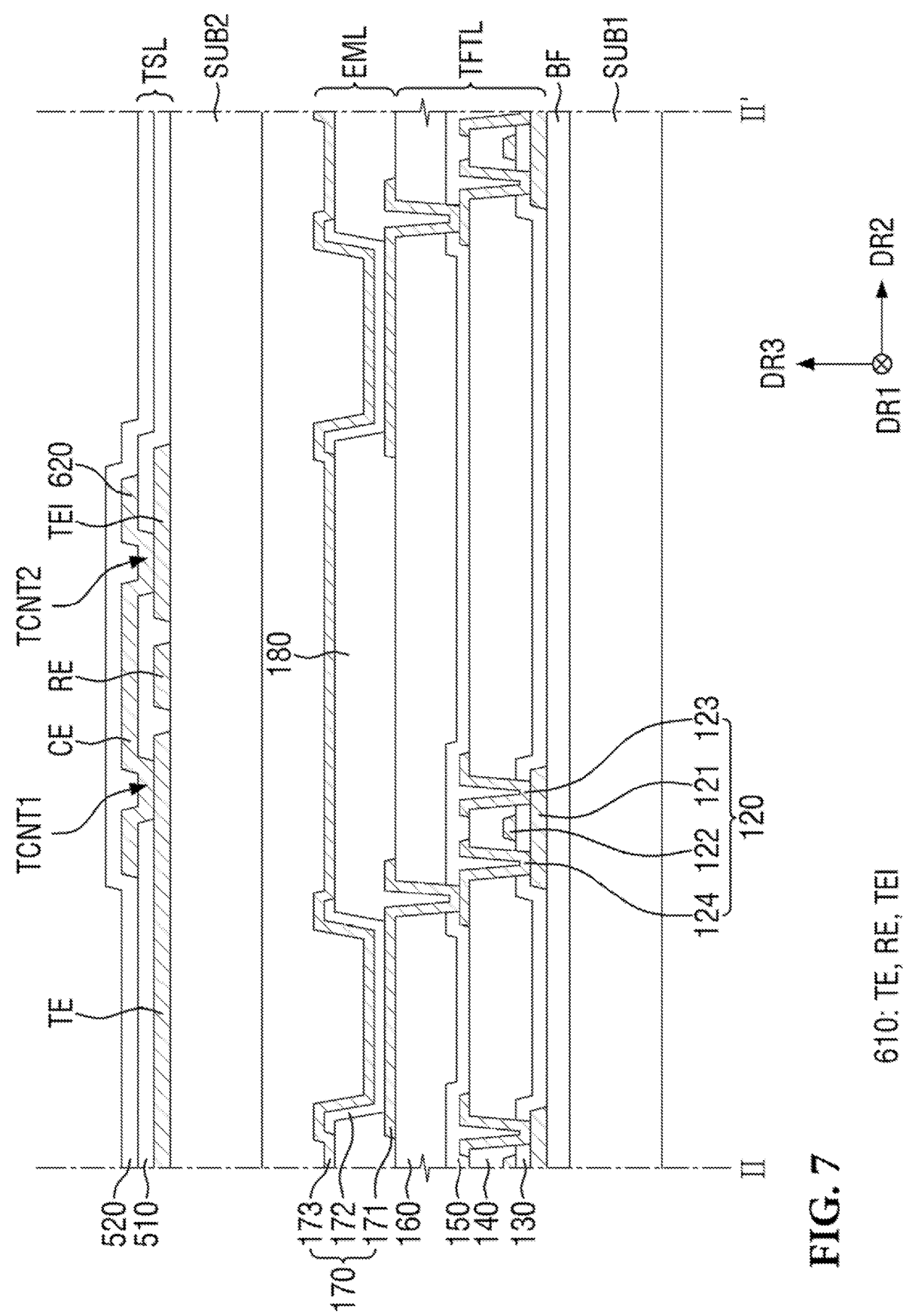
FIG. 7 is a cross-sectional view illustrating a cross-section taken along line II-II' of FIG. 6 according to an embodiment of the present invention.

FIG. 6 is a plan view illustrating region A of FIG. 5. FIG. 7 is a cross-sectional view taken along line II-II' of FIG. 6.

Referring to FIGS. 6 and 7, the thin film transistor layer TFTL is disposed on the first substrate SUB1. The thin film transistor layer TFTL includes thin film transistors 120, a gate insulating film 130, an interlayer insulating film 140, a protective film 150, and a planarizing film 160.

A buffer film BF may be formed on one surface (e.g., an upper surface) of the first substrate SUB1. For example, the buffer film BF may be disposed between the thin film transistor TFTL and the first substrate SUB1. The buffer film BF may be disposed on the one surface of the first substrate SUB1 to protect the thin film transistors 120 and an organic light-emitting layer 172 of the light-emitting element layer EML from moisture permeating through the first substrate SUB) vulnerable to moisture transmission. The buffer film BF may include a plurality of inorganic films which are alternately stacked. For example, the buffer film BF may be formed as a multi-film comprised of inorganic films such as a silicon nitride layer, a silicon oxynitride layer, a silicon oxide layer, a titanium oxide layer, and/or an aluminum oxide layer alternately stacked. However, according to an embodiment of the present invention, the buffer film BF may be omitted.

The thin film transistor 120 is disposed on the buffer film BF. The thin film transistor 120 includes an active layer 121, a gate electrode 122, a source electrode 123, and a drain electrode 124. The thin film transistor 120 is illustrated in FIG. 7 as being formed as a top gate type in which the gate electrode 122 is disposed on the active layer 121, but the present disclosure is not limited thereto. For example, the thin film transistors 120 may be formed as a bottom gate type in which the gate electrode 122 is disposed below the active layer 121 or a double gate type in which the gate electrode 122 is disposed on both of an upper and a lower portion of the active layer 121.

The active layer 121 is formed on the buffer film BF. The active layer 121 may include an organic semiconductor including polycrystalline silicon, single crystal silicon, low temperature polycrystalline silicon, and/or amorphous silicon, or an oxide semiconductor. A light blocking layer configured to block external light incident on the active layer 121 may be formed between the buffer film BF and the active layer 121.

The gate insulating film 130 may be disposed on the active layer 121. The gate insulating film 130 may include an inorganic film including, for example, silicon nitride, silicon oxynitride, silicon oxide, a titanium oxide, and/or aluminum oxide.

The gate electrode 122 and a gate line may be formed on the gate insulating film 130. The gate electrode 122 and the gate line may be formed as a single layer or a multi-layer including molybdenum (Mo), aluminum (Al), chromium (Cr), gold (Au), titanium (Ti), nickel (Ni), neodymium (Nd), and/or copper (Cu).

The interlayer insulating film 140 may be disposed on the gate electrode 122 and the gate line. The interlayer insulating film 140 may include an inorganic film, including, for example, silicon nitride, silicon oxynitride, silicon oxide, titanium oxide, or aluminum oxide.

The source electrode 123 and the drain electrode 124 may be disposed on the interlayer insulating film 140. The source electrode 123 and the drain electrode 124 may be connected to the active layer 121 through contact holes passing through the gate insulating film 130 and the interlayer insulating film 140. The source electrode 123 and the drain electrode 124 may be formed as a single layer or a multi-layer made of molybdenum (Mo), aluminum (Al), chromium (Cr), gold (Au), titanium (Ti), nickel (Ni), neodymium (Nd), and/or copper (Cu).

The protective film 150 may be formed on the source electrode 123 and the drain electrode 124 and may insulate the thin film transistor 120. The protective film 150 may include an inorganic film, including, for example, silicon nitride, silicon oxynitride, silicon oxide, titanium oxide, or aluminum oxide.

The planarizing film 160 may be formed on the protective film 150 to planarize a stepped portion due to the thin film transistor 120. The planarizing film 160 may include an organic film made of an acryl resin, an epoxy resin, a phenolic resin, a polyamide resin, and/or polyimide resin.

The light-emitting element layer EML may be disposed on the thin film transistor layer TFTL. The light-emitting element layer EML includes light-emitting elements 170 and a pixel definition film 180.

The light-emitting elements 170 and the pixel definition film 180 are disposed on the planarizing film 160. Each of the light-emitting elements 170 may include a first electrode 171, an organic light-emitting layer 172, and a second electrode 173.

The first electrode 171 may be disposed on the planarizing film 160. The first electrode 171 is connected to the drain electrode 124 of the thin film transistor 120 through a contact hole passing through the protective film 150 and the planarizing film 160.

The pixel definition film 180 may be disposed to partition the first electrodes 171 on the planarizing film 160. The pixel definition film 180 may be disposed to cover an edge of the first electrode 171. The pixel definition film 180 may be an organic film including acryl resin, epoxy resin, phenolic resin, polyamide resin, and/or polyimide resin.

Each of the pixels P refers to a region in which the first electrode 171, the organic light-emitting layer 172, and the second electrode 173 are sequentially stacked. Holes from the first electrode 171 and electrons from the second electrode 173 combine with each other in the organic light-emitting layer 172 to emit light.

The organic light-emitting layer 172 may be formed on the first electrode 171 and the pixel definition film 180. The organic light-emitting layer 172 may include an organic material to emit a certain color. For example, the organic light-emitting layer 172 may include a hole transporting layer, an organic material layer, and an electron transporting layer.

The second electrode 173 is disposed on the organic light-emitting layer 172. The second electrode 173 may be disposed to cover the organic light-emitting layer 172. The second electrode 173 may be a common layer commonly formed in the pixels P. A capping layer may be formed on the second electrode 173.

The second substrate SUB2 is disposed on the light-emitting element layer EML, and the touch sensor layer TSL is disposed on the second substrate SUB2. The touch sensor layer TSL includes the first touch electrodes TE, the second touch electrodes RE, the connection electrodes CE, the touch driving wires TL1 to TLp, the touch sensing wires RL1 to RLp, the guard lines GL1, GL2, GL3, and GL4, and the ground lines GRL1 and GRL2. For convenience of description and illustration, only the first touch electrodes TE and the second touch electrodes RE disposed in the touch sensor region TSA of the touch sensor layer TSL, first touch island electrodes TEI disposed between the first touch electrodes TE, and the connection electrodes CE are illustrated in FIGS. 6 and 7.

A first touch conductive layer 610 is disposed on the second substrate SUB2. The first touch conductive layer 610 may include a transparent metal oxide (TCO) such as indium tin oxide (ITO) or indium zinc oxide (IZO) that may transmit light.

The first touch conductive layer 610 may include the first touch electrodes TE, the second touch electrodes RE, and the first touch island electrodes TEI. The first touch electrode TE, the second touch electrode RE, and the first touch island electrode TE include a transparent metal oxide, an aperture ratio of the pixel P may not be decreased even when the first touch electrode TE, the second touch electrode RE, and the first touch island electrode TEI overlap the pixel P.

The first touch electrode TE and the first touch island electrode TEI may be alternately disposed in the first direction (e.g., the DR1 direction) and may be spaced apart from each other in the second direction (e.g., the DR2 direction). The first touch electrode TE and the first touch island electrode TEI spaced apart from each other may be electrically connected through the connection electrode CE to be described below.

A first touch insulating layer 510 is disposed on the first touch conductive layer 610. The first touch insulating layer 510 covers the first touch conductive layer 610 except for portions in which touch contact holes TCNT1 and TCNT2 are formed. The first touch insulating layer 510 insulates the first touch conductive layer 610 and a second touch conductive layer 620 from each other except at contact holes CNT and/or touch contact holes TCNT. The first touch insulating layer 510 may be formed as an inorganic layer, including, for example, silicon nitride, silicon oxynitride, silicon oxide, titanium oxide, and/or aluminum oxide.

The second touch conductive layer 620 is disposed on the first touch insulating layer 510. The second touch conductive layer 620 may be formed as an opaque metal conductive layer, for example, a single layer or a multi-layer including molybdenum (Mo), aluminum (Al), chromium (Cr), gold (Au), titanium (Ti), nickel (Ni), neodymium (Nd), and/or copper (Cu).

The second touch conductive layer 620 may include the connection electrodes CE. The connection electrode CE is comprised of a conductive layer including opaque metals, in order to prevent a decrease in aperture ratio of the pixel P, as shown in FIG. 7, the connection electrode CE may be disposed to not overlap the pixel P and to overlap the pixel definition film 180.

The connection electrode CE may connect the first touch electrode TE and the first touch island electrode TEI. For example, the connection electrode CE may be connected to the first touch electrode TE through a first touch contact hole TCNT1 that passes through the first touch insulating layer 510 and exposes the first touch electrode TE. The connection electrode CE may be connected to the first touch island electrode TE through a second touch contact hole TCNT2 that passes through the first touch insulating layer 510 and exposes the first touch island electrode TEI. Accordingly, the first touch electrode TE and the first touch island electrode TE may be connected through the connection electrode CE.

A second touch insulating layer 520 is disposed on the second touch conductive layer 620. The second touch insulating layer 520 covers the second touch conductive layer 620. The second touch insulating layer 520 may include an inorganic layer, including for example, silicon nitride, silicon oxynitride, silicon oxide, titanium oxide, and/or an aluminum oxide.

Hereinafter, a connection relationship between the touch driving wires TL1 to TLp will be described in more detail later on herein.

Figure 8:
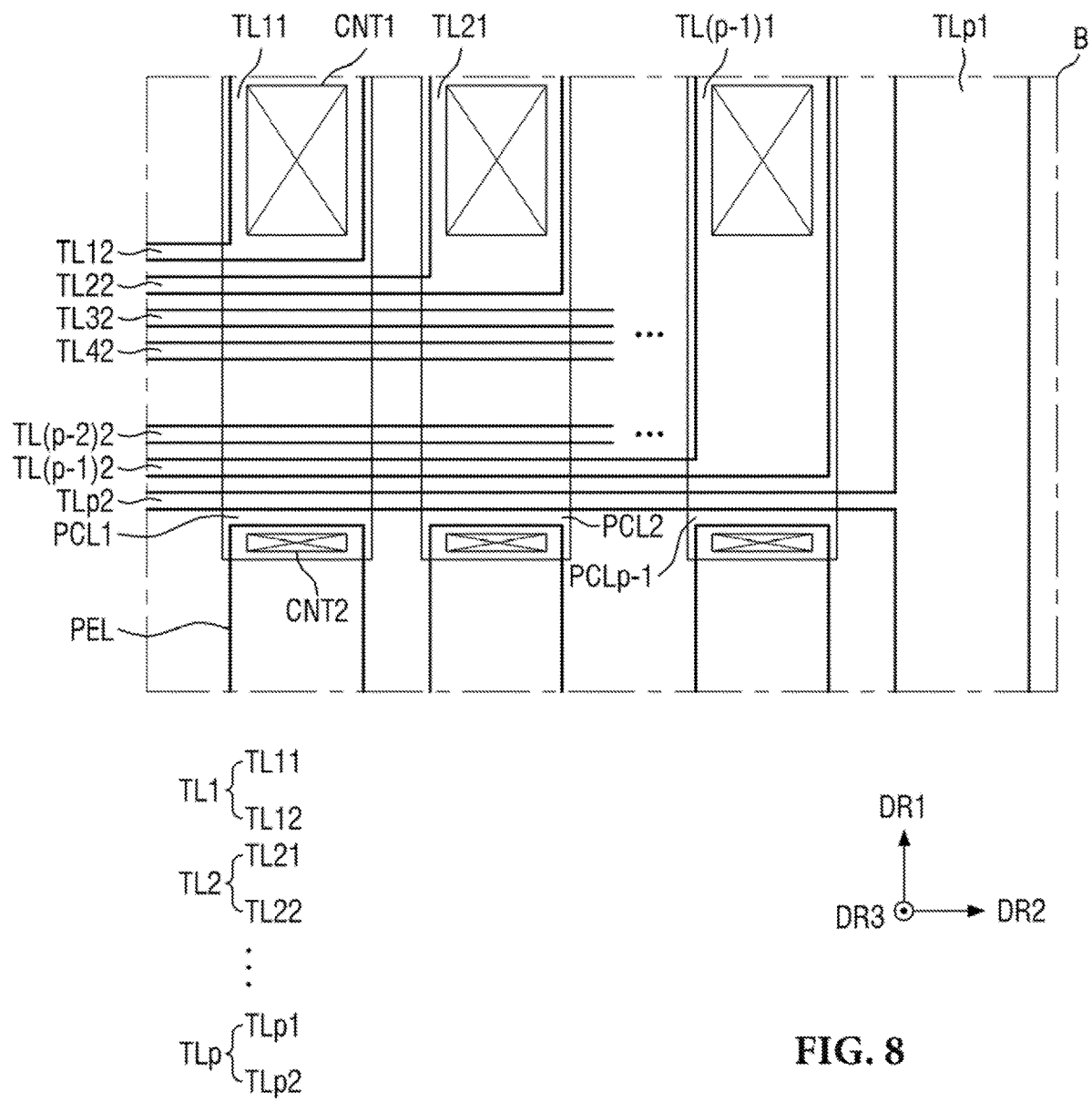
FIG. 8 is an enlarged plan view illustrating region B of FIG. 5 according to an embodiment of the present invention.
Figure 9:
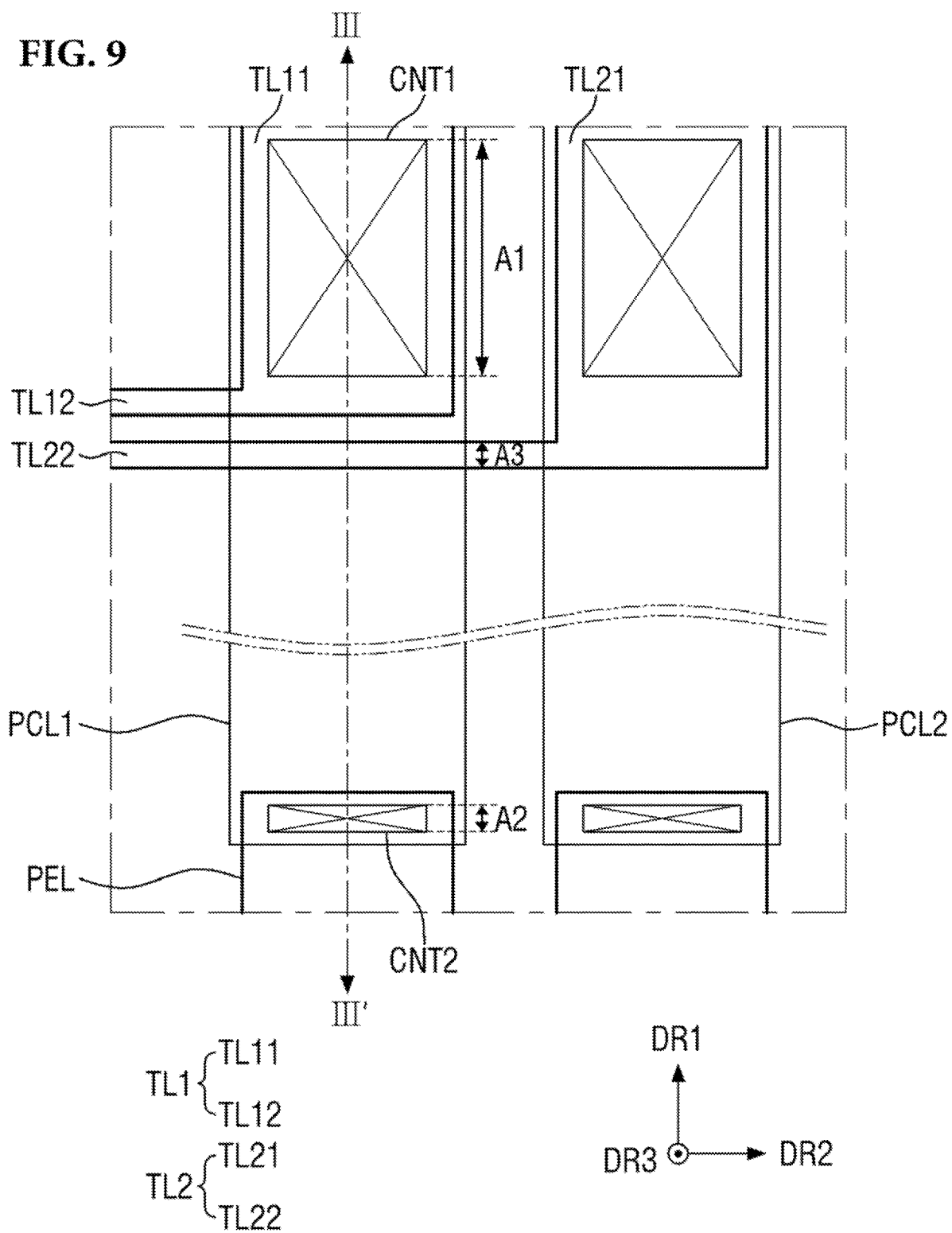
FIG. 9 is a plan view illustrating some touch driving wires of FIG. 8 according to an embodiment of the present invention.
Figure 10:
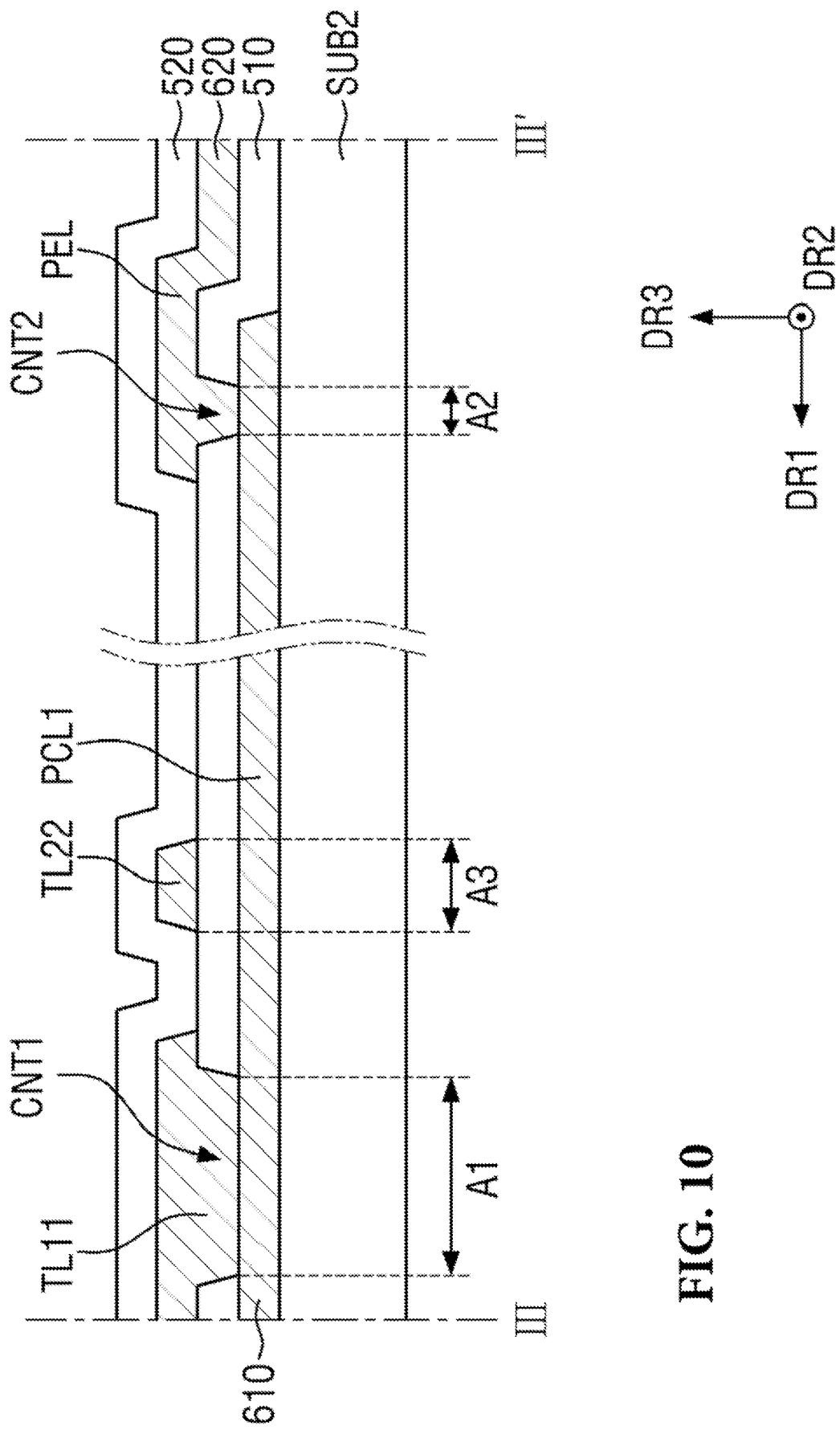
FIG. 10 is a cross-sectional view illustrating a cross-section taken along line III-III' of FIG. 9 according to an embodiment of the present invention.

FIG. 8 is an enlarged plan view illustrating region B of FIG. 5. FIG. 9 is a plan view illustrating some of the touch driving wires of FIG. 8. FIG. 10 is a cross-sectional view taken along line III-III' of FIG. 9.

Referring to FIGS. 8, 9, and 10, the first to $(p-1)^{th}$ touch driving wires TL1 to TL(p-1)1 are connected to the touch electrode pads TP through the pad electrode lines PEL and pad connection lines PCL. In contrast, the $p^{th}$ touch driving wire TLp may be connected directly to the touch electrode pad TP without the pad electrode line PEL and the pad connection line PCL. For example, the first touch driving wire TL1 may be connected to the pad electrode line PEL through a first pad connection line PCL1. The second touch driving wire TL2 may be connected to the pad electrode line PEL through a second pad connection line PCL2. In addition, the $(p-1)^{th}$ touch driving wire TL(p-1) may be connected to the pad electrode line PEL through a $(p-1)^{th}$ pad connection line PCLp-1. A plurality of pad electrode lines PEL are connected to the touch electrode pads TP, and the first to $(p-1)^{th}$ touch driving wires TL1 to TL(p-1) may be connected to the touch electrode pads TP through the pad electrode lines PEL and the pad connection lines PCL. Hereinafter, for convenience of description, the first touch driving wire TL1 will mainly be described.

The first touch driving wire TL1 and the pad electrode line PEL may be spaced apart from each other in a plan view. For example, the first touch driving wire TL1 and the pad electrode line PEL may be spaced apart from each other in a first direction (e.g., the DR1 direction). The first touch driving wire TL1 and the pad electrode line PEL may be electrically connected through the first pad connection line PCL1. The pad connection line PCL1 may extend in the first direction (e.g., the DR1 direction).

For example, the first routing line TL11 of the first touch driving wire TL1 may be in contact with the first pad connection line PCL1 through the first contact hole CNT1 exposing a first end of the first pad connection line PCL1. The pad electrode line PEL may be in contact with the first pad connection line PCL1 through the second contact hole CNT2 exposing a second end of the first pad connection line PCL1. Accordingly, the first touch driving wire TL1 may be electrically connected to the pad electrode line PEL through the first pad connection line PCL1 (e.g., through the first contact hole CNT1 and the second contact hole CNT2) and may be electrically connected to the touch electrode pad TP through the pad electrode line PEL.

The first pad connection line PCL1 may be disposed on the second substrate SUB2. The first pad connection line PCL1 may be composed of the first touch conductive layer 610. In addition, the first pad connection line PCL1 may be disposed in the same layer as the above-described first touch electrode TE. For example, the first pad connection line PCL1 may include the same material as the first touch electrode TE or may include at least one material selected from the materials described above as the structural materials of the first touch electrode TE.

The first touch driving wire TL1 and the pad electrode line PEL may be disposed on the first pad connection line PCL1. The first touch driving wire TL1 and the pad electrode line PEL may be composed of the second touch conductive layer 620. In addition, the first touch driving wire TL1 and the pad electrode line PEL may be disposed in the same layer as the above-described connection electrode CE. In addition, although not illustrated, touch sensing wire RL may be disposed in the same layer as the above-described the touch driving wire TL and composed of the second touch conductive layer 620. For example, the first touch driving wire TL1 and the pad electrode line PEL may include the same material as the connection electrode CE or may include at least one material selected from the materials described above as the structural materials of the connection electrode CE.

According to an embodiment of the present invention, a lower surface of the pad electrode line PEL may be disposed on an upper surface of the first pad connection line PCL1.

The first touch insulating layer 510 may be disposed between the first touch driving wire TL1 and the pad electrode line PEL, and the first pad connection line PCL1.

The first touch insulating layer 510 may have the first contact hole CNT1 exposing the first end of the first pad connection line PCL1 and the second contact hole CNT2 exposing the second end of the first pad connection line PCL1. The first routing line TL11 of the first touch driving wire TL1 may be in contact with the first end of the first pad connection line PCL1 through the first contact hole CNT1. The pad electrode line PEL may be in contact with the second end of the first pad connection line PCL1 through the second contact hole CNT2. Accordingly, the first touch driving wire TL1 may be electrically connected to the pad electrode line PEL through the first pad connection line PCL1.

The first pad connection line PCL1 may include a first region A1 which is a region in contact with the first routing line TL11 of the first touch driving wire TL1. For example, the area of the first region A1 may substantially correspond to an area of the first contact hole CNT1. In addition, the first pad connection line PCL1 may include a second region A2 which is a region in contact with the pad electrode line PEL. A width of the first region A1 in the first direction (e.g., the DR1 direction) may be greater than a width of the second region A2 in the first direction (e.g., the DR1 direction). For example, an area of the second region A2 may correspond substantially to an area of the second contact hole CNT2. In addition, an area of the first region A1 may be greater than an area of the second region A2. For example, an area in which the first pad connection line PCL1 is in contact with the first routing line TL11 of the first touch driving wire TL1 may be greater than an area in which the first pad connection line PCL1 is in contact with the pad electrode line PEL. In this case, even when the first routing line TL11 of the first touch driving wire TL1 overlaps the first pad connection line PCL1, it is possible to increase the area in which the first routing line TL11 is in contact with the first pad connection line PCL1, thereby preventing a capacitor from being formed in a corresponding region. For example, a space in which electric charges are accumulated may be removed from a region in which the first routing line TL1 overlaps the first pad connection line PCL1, thereby preventing electrostatic defects. However, the present invention is not limited thereto. For example, the first region A1 may be smaller than the second region A2.

In addition, the first pad connection line PCL1 may partially overlap the second routing lines TL22 to TLp2 of the second to $p^{th}$ touch driving wires TL2 to TLp. A region in which the first pad connection line PCL1 partially overlaps each of the second routing lines TL22 to TLp2 of the second to $p^{th}$ touch driving wires TL2 to TLp may be defined as a third region A3. For example, an area of the third region A3 may correspond to the area bounded by a width in the first direction (e.g., the DR1 direction) and a length in the second direction (e.g., the DR2 direction) of the second routing lines TL22 to TLp2 overlapping the first pad connection line PCL1. For example, the length of the third region may refer to a length in the second direction (e.g., the DR2 direction) of the first pad connection line PCL. The width of the first region A1 in the first direction (e.g., the DR1 direction) may be greater than a width of the third region A3 in the first direction (e.g., the DR1 direction). For example, the width of the first region A1 in the first direction (e.g., the DR1 direction) may be greater than a width of the second routing lines TL22 to TLp2 of the second to $p^{th}$ touch driving wires TL2 to TLp in the first direction (e.g., the DR1 direction). However, the present invention is not limited thereto. For example, the third region A3 may have a greater width in the first direction (e.g., the DR1 direction) than a width of the first region A1.

As described above, it is possible to increase the area of the first regions A1 of the first contact holes CNT1 in which respective first routing lines TL11 to TLp1 of the touch driving wires TL1 to TLp are in contact with respective pad connection lines PCL, thereby preventing a capacitor from being formed in a region in which each of the first routing lines TL11 to TLp1 overlap each of the pad connection lines PCL. For example, a space in which electric charges are accumulated may be removed from the region in which each of the first routing lines TL11 to TLp1 overlaps each of the pad connection line PCL, thereby preventing electrostatic defects.

According to an embodiment of the present invention, the first end portion of the pad connection line PCL contacting the first contact hole CNT1 and overlapping the first region A1 may overlap a branching point of each of the touch driving wires TL1 to TLp. The first regions A1 associated with a respective touch driving wire TL1 to TLp may extend in the first direction (e.g., the DR1 direction) and may be spaced apart from one another in the second direction (e.g., the DR2 direction). The second routing lines (e.g., second routing lines TL12 and TL22) may have a width corresponding to the width of the third region A3.

Figure 11:
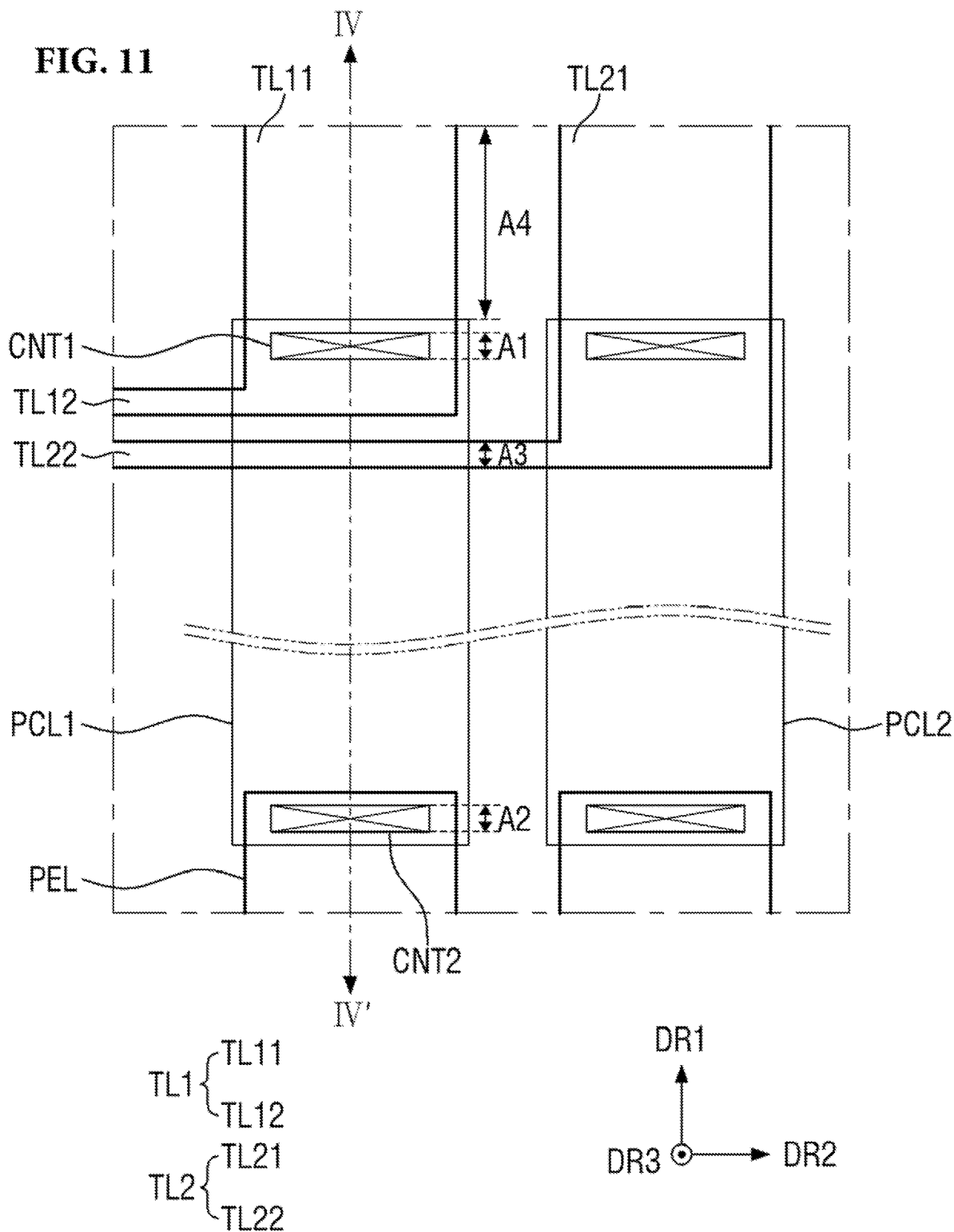
FIG. 11 is a plan view illustrating a touch unit according to an embodiment of the present invention embodiment.
Figure 12:
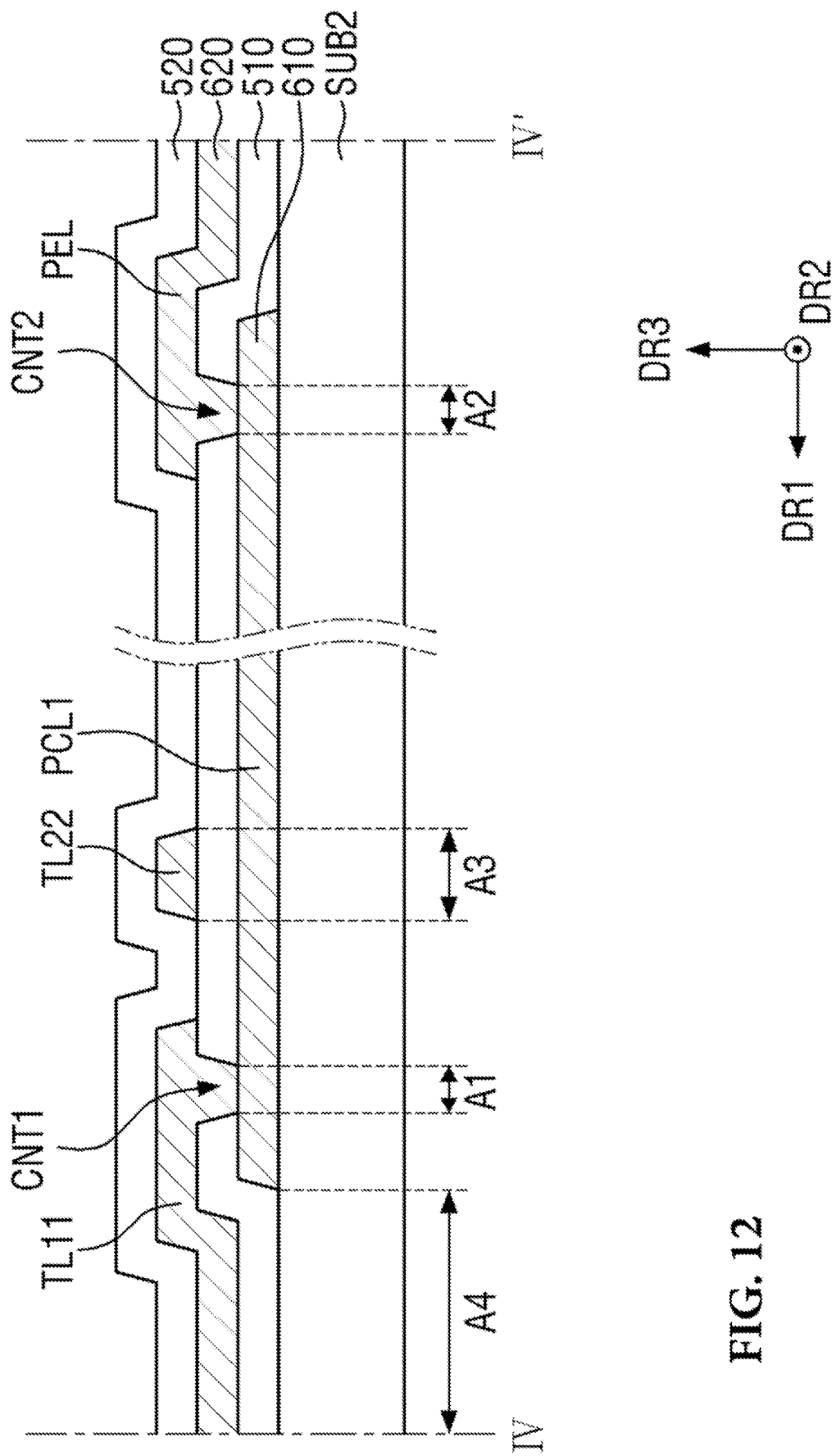
FIG. 12 is a cross-sectional view illustrating a cross-section taken along line IV-IV' of FIG. 11 according to an embodiment of the present invention.

FIG. 11 is a plan view illustrating a touch unit TDU according to an embodiment of the present invention. FIG. 12 is a cross-sectional view taken along line IV-IV' of FIG. 11.

Referring to FIGS. 11 and 12, each of touch driving wires TL1 to TLp of a display device according to the present embodiment of the present invention may include a fourth region A4 which does not partially overlap a pad connection line PCL. For example, the pad connection line PCL may not be disposed in the fourth region A4. For example, the first end portion of the pad connection line PCL may correspond to the width of the first region A1 in the first direction (e.g., the DR1 direction). The pad connection line PCL may be in contact with each of the touch driving wires TL1 to TLp, and the pad connection line PCL may be disposed in a region including the first, second, and third regions A1, A2, and A3, but not the fourth region A4. Thus, it is possible to minimize an area in which the pad connection line PCL overlaps each of the touch driving wires TL1 to TLp in a third direction (e.g., the DR3 direction). Therefore, it is possible to prevent a capacitor from being formed due to the pad connection line PCL overlapping each of the touch driving wires TL1 to TLp. For example, a space in which electric charges are accumulated may be minimized in a region in which the pad connection line PCL overlaps each of the touch driving wires TL1 to TLp, thereby preventing electrostatic defects. According to an embodiment of the present invention, the first end portion of the pad connection line PCL contacting the first contact hole CNT1 and overlapping the first region A1 may overlap a branching point of each of the touch driving wires TL1 to TLp. The first region A1 may have a substantially similar width to the first end portion of the pad connection line PCL and the first contact hole CNT1 in the first direction (e.g., the DR direction).

For example, a width of the fourth region A4 in a first direction (e.g., the DR1 direction) may be greater than a width of the first region A1 in the first direction (e.g., the DR1 direction). A width of the fourth region A4 in a second direction (e.g., the DR2 direction) may be greater than a width of the first region A1 in the second direction (e.g., the DR2 direction). In addition, an area of the fourth region A4 may be greater than an area of the first region A1. For example, the fourth region A4 may refer to a portion of the first routing line TL11 to TLp1 extending orthogonally to the respective branched second routing lines TL12 to TLp2 that is not overlapped by the pad connection line PCL.

In addition, the width of the fourth region A4 in the first direction (e.g., the DR1 direction) is greater than a width of the second region A2 in the first direction (e.g., the DR1 direction), and the area of the fourth region A4 is greater than an area of the second region A2.

Furthermore, the width of the fourth region A4 in the first direction (e.g., the DR1 direction) may be greater than a width of the third region A3 in the first direction (e.g., the DR1 direction). For example, the width of the fourth region A4 in the first direction (e.g., the DR1 direction) may be greater than a width of second routing lines TL22 to TLp2 of the second to $p^{th}$ touch driving wires TL2 to TLp in the first direction (e.g., the DR1 direction).

The pad connection line PCL is not disposed in the fourth region A4, a first touch insulating layer 510 may be in direct contact with a second substrate SUB2 in the fourth region A4.

Hereinafter an embodiment of the present invention will be described.

Figure 13:
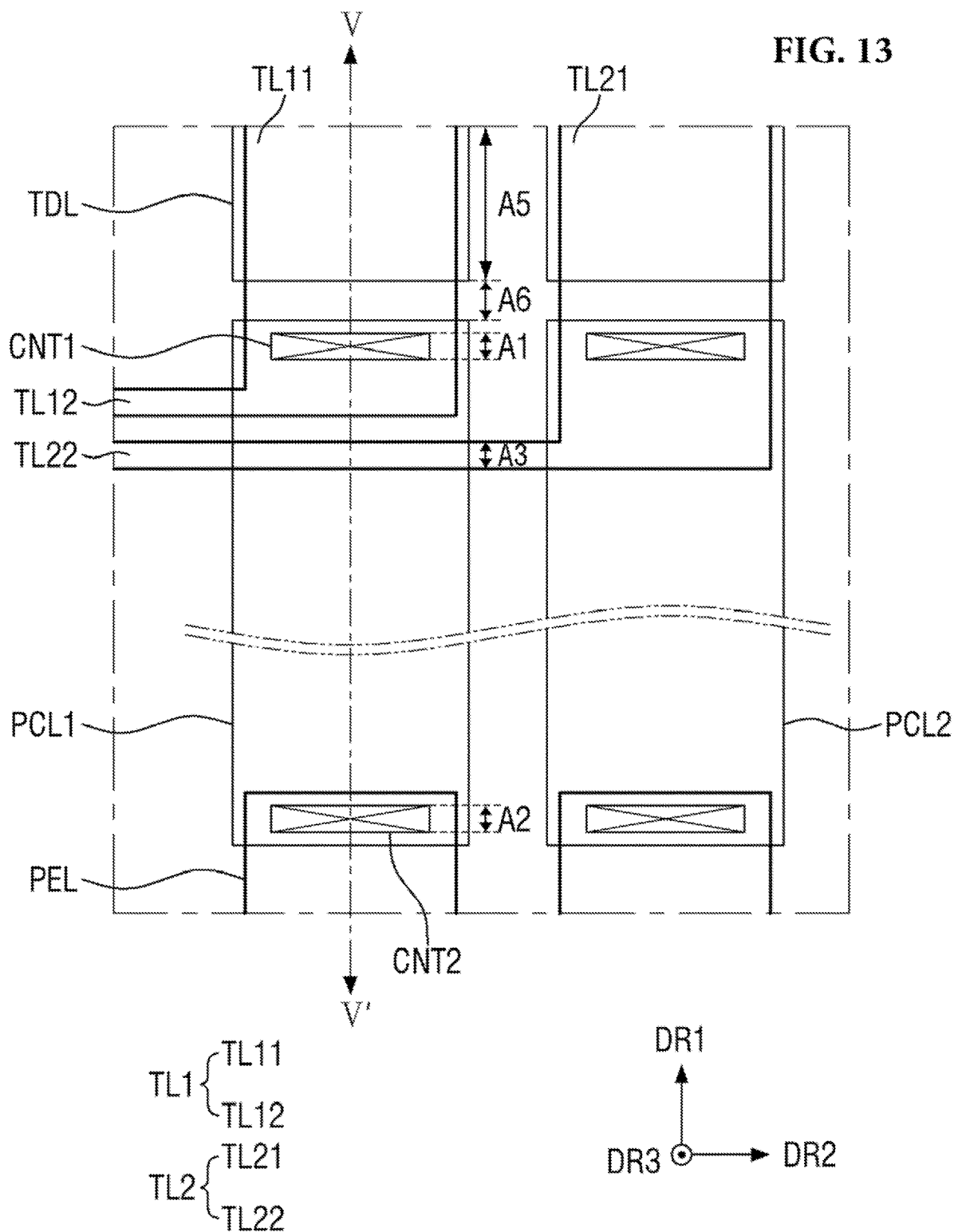
FIG. 13 is a plan view illustrating a touch unit according to an embodiment of the present invention.
Figure 14:
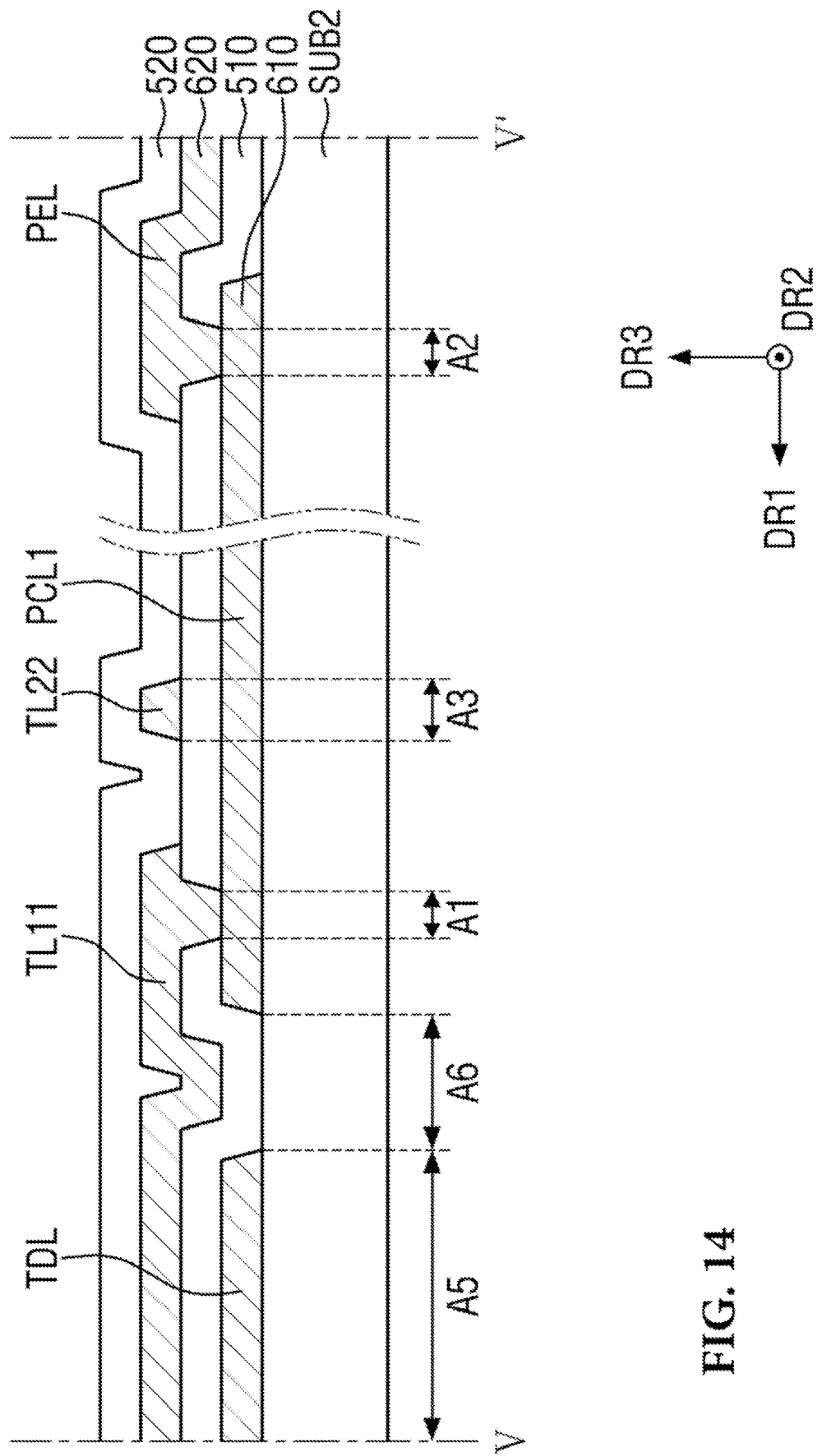
FIG. 14 is a cross-sectional view illustrating a cross-section taken along line V-V' of FIG. 13 according to an embodiment of the present invention.

FIG. 13 is a plan view illustrating a touch unit TDU according to still an embodiment of the present invention. FIG. 14 is a cross-sectional view taken along line V-V' of FIG. 13.

Referring to FIGS. 13 and 14, a display device according to the present embodiment may further include a touch signal layer TDL.

The touch signal layer TDL may be disposed on a second substrate SUB2. The touch signal layer TDL may be composed of a first touch conductive layer 610. In addition, the touch signal layer TDL may be disposed in the same layer as the above-described pad connection line PCL. For example, the touch signal layer TDL may include the same material as the pad connection line PCL or may include at least one material selected from the materials described as the structural materials of the pad connection line PCL. In addition, the touch signal layer TDL may be disposed in the same layer as the above-described first touch electrode TE. For example, the touch signal layer TDL may include the same material as the first touch electrode TE or may include at least one material selected from the materials described as the structural materials of the first touch electrode TE.

Touch driving wires TL1 to TLp may be disposed above the touch signal layers TDL. A first touch insulating layer 510 may be disposed between the touch signal layers TDL and the touch driving wires TL1 to TLp. Hereinafter, for convenience of description, the first touch driving wire TL1 will mainly be described.

The touch signal layer TDL may overlap a first touch driving wire TL1 in a third direction (e.g., the DR3 direction). For example, the touch signal layer TDL may overlap a first routing line TL11 of the first touch driving wire TL1 in the third direction (e.g., the DR3 direction).

The first routing line TL11 of the first touch driving wire TL1 may include a fifth region A5 that overlaps the touch signal layer TDL. The first routing line TL11 of the first touch driving wire TL1 may include a sixth region A6 that does not overlap the touch signal layer TDL and a first pad connection line PCL1. For example, the first touch conductive layer 610 may not be disposed in the sixth region A6. The first touch conductive layer 610 is disposed in a first region A1 in which the first touch conductive layer 610 is in contact with the first touch driving wire TL1 and the fifth region A5 in which the first touch conductive layer 610 overlaps the first touch driving wire TL1. The first touch conductive layer 610 may not be disposed in the sixth region A6. Thus, it is possible to minimize an area in which the first touch conductive layer 610 overlaps the first touch driving wire TL1 in the third direction DR3. Accordingly, it is possible to prevent a capacitor from being formed due to the first touch conductive layer 610 overlapping the first touch driving wire TL1. For example, a space in which electric charges are accumulated may be minimized in a region in which the first touch conductive layer 610 overlaps the first touch driving wire TL1, thereby preventing electrostatic defects as described above.

The first touch conductive layer 610 is not disposed in the sixth region A6, a first touch insulating layer 510 may be in direct contact with the second substrate SUB2 in the sixth region A6.

A width of the fifth region A5 in a first direction (e.g., the DR1 direction) may be greater than a width of first to third regions A1 to A3 in the first direction (e.g., the DR1 direction). In addition, an area of the fifth region A5 may be greater than an area of the first to third regions A1 to A3.

A width of the sixth region A6 in the first direction (e.g., the DR1 direction) may be greater than the width of the first to third regions A1 to A3 in the first direction (e.g., the DR1 direction). In addition, an area of the sixth region A6 may be greater than the area of the first to third regions A1 to A3 in the first direction (e.g., the DR direction).

Furthermore, the width of the fifth region A5 in the first direction (e.g., the DR1 direction) may be greater than the width of the sixth region A6 in the first direction (e.g., the DR1 direction). In addition, the area of the fifth region A5 may be greater than the area of the sixth region A6.

embodiment

Figure 15:
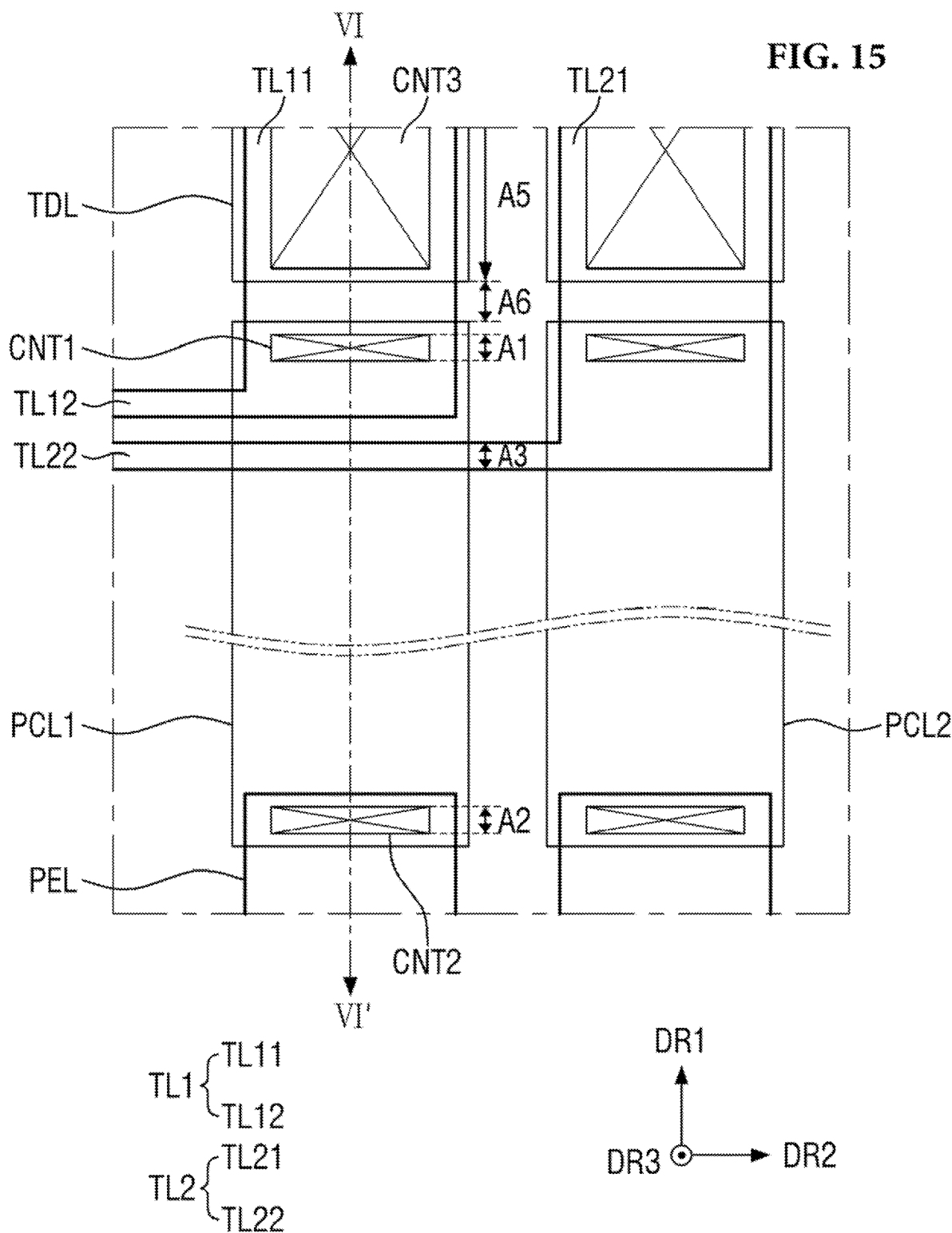
FIG. 15 is a plan view illustrating a touch unit according to an embodiment of the present invention embodiment.
Figure 16:
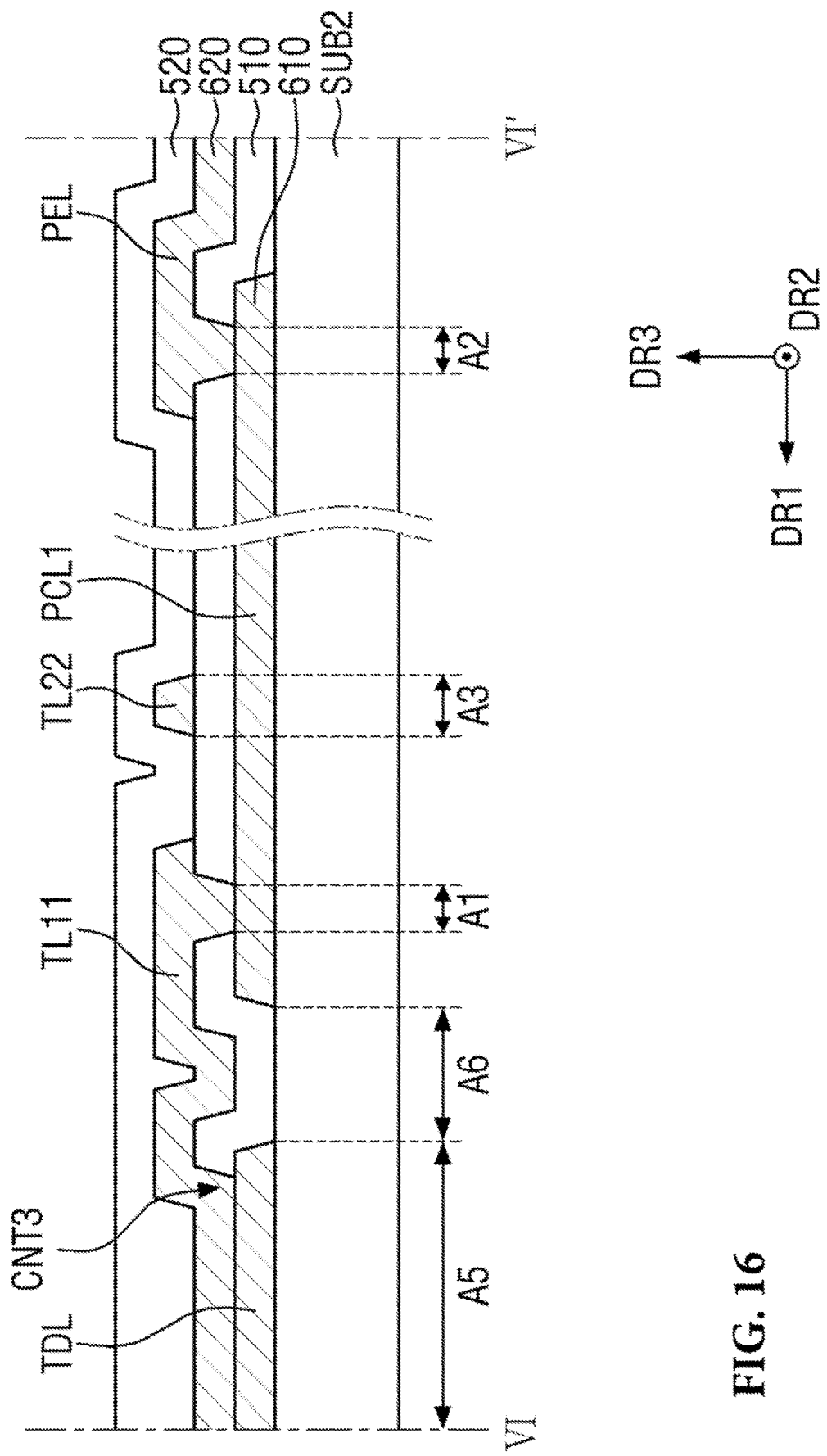
FIG. 16 is a cross-sectional view illustrating a cross-section taken along line VI-VI' of FIG. 15 according to an embodiment of the present invention.

FIG. 15 is a plan view illustrating a touch unit TDU according to an embodiment of the present invention. FIG. 16 is a cross-sectional view taken along line VI-VI' of FIG. 15.

Referring to FIGS. 15 and 16, a display device according to the present embodiment is different from the embodiment shown in FIGS. 13 and 14 in that a touch signal layer TDL is electrically connectable to each of touch driving wires TL1 to TLp. Hereinafter, for convenience of description, a first touch driving wire TL1 will mainly be described.

The touch signal layer TDL and the first touch driving wire TL1 may be in contact with each other in a fifth region A5. For example, a first touch insulating layer 510 disposed between the touch signal layer TDL and the first touch driving wire TL1 may have a third contact hole CNT3 exposing an end of the touch signal layer TDL. The third contact hole CNT3 may be formed in the fifth region A5. A first routing line TL11 of the first touch driving wire TL1 may be in contact with the end of the touch signal layer TDL through the third contact hole CNT3. Thus, the first routing line TL11 of the first touch driving wire TL1 may be electrically connected to the touch signal layer TDL. In this case, even when the first routing line TL11 of the first touch driving wire TL1 is partially open due to scratches or the like, conductivity may be maintained by the touch signal layer TDL. Therefore, it is possible to prevent some touch electrodes of a touch sensing unit TDU from not being operable.

An area in which the touch signal layer TDL is in contact with the first touch driving wire TL1 may be greater than an area in which a first pad connection line PCL1 is in contact with the first touch driving wire TL1.

Figure 17:
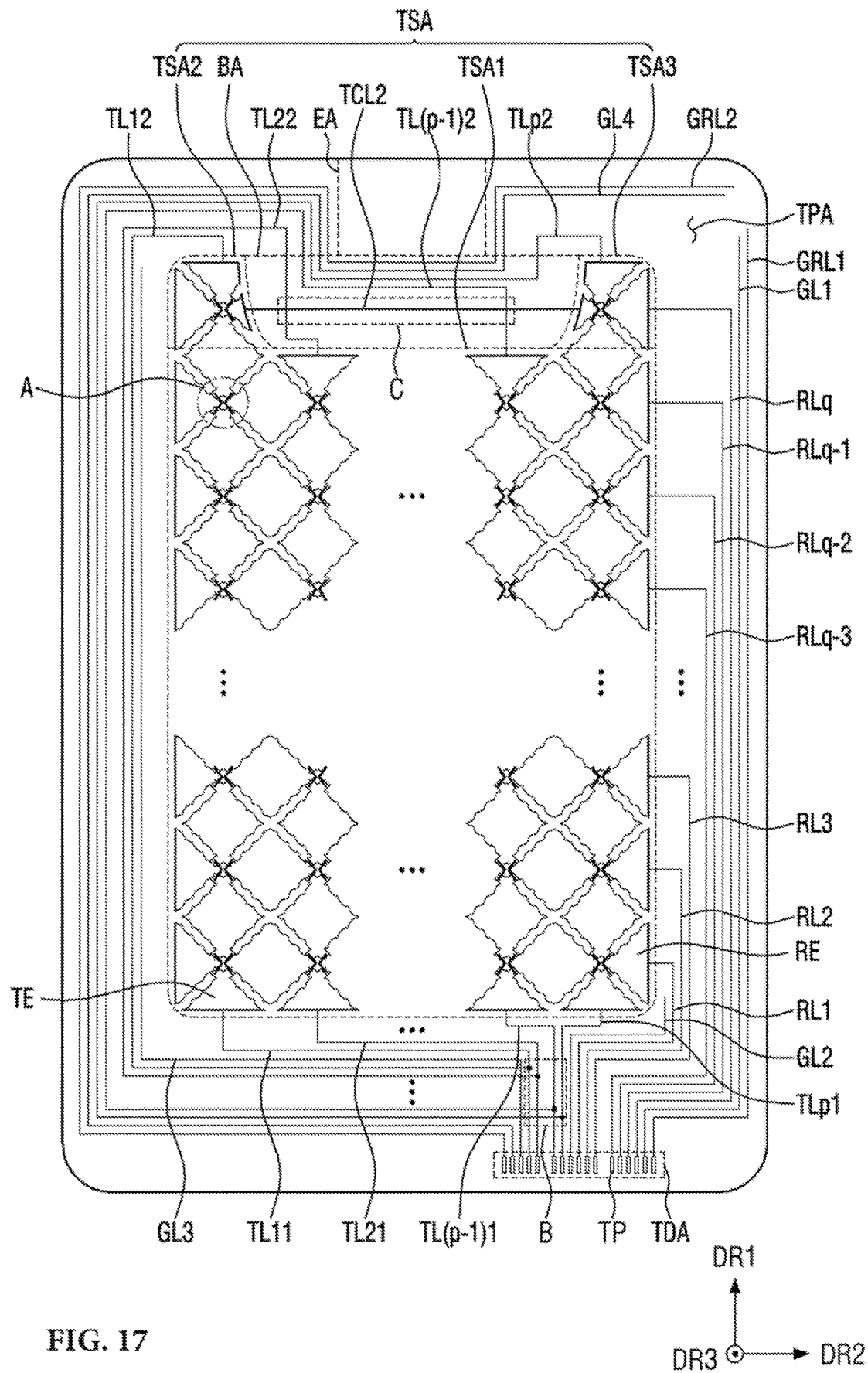
FIG. 17 is a plan view illustrating a touch unit according to an embodiment of the present invention embodiment.

FIG. 17 is a plan view illustrating a touch unit TDU according to an embodiment of the present invention.

Referring to FIG. 17, a touch sensor region TSA of a touch unit TDU according to the present embodiment may include a first touch sensor region TSAI, a second touch sensor region TSA2, and a third touch sensor region TSA3. The first touch sensor region TSAI may have a rectangular shape in a plan view. The first touch sensor region TSAI may occupy most of the touch sensor region TSA.

The second touch sensor region TSA2 and the third touch sensor region TSA3 may protrude from opposite sides of the first touch sensor region TSA1, for example, in the second direction (e.g., the DR2 direction). The second touch sensor region TSA2 may protrude from an edge of a first side of the first touch sensor region TSAl, and the third touch sensor region TSA3 may protrude from an edge of a second side of the first touch sensor region TSA1. As a result, the touch sensor region TSA may further include a recessed region BA having a shape in which a center of one side thereof is recessed. In addition, the recessed region BA may be disposed between the second touch sensor region TSA2 and the third touch sensor region TSA3 in the second direction (e.g., the DR2 direction).

In addition, an empty region EA may be formed outside the recessed region BA in a first direction (e.g., the DR1 direction). A camera device, a proximity sensor device, an luminance sensor device, and an iris recognition sensor device may be disposed to overlap the empty region EA when a display device 10 is implemented as a mobile phone, a smartphone, or a tablet PC. Thus, it is possible to omit a bezel for accommodating the camera device, the proximity sensor device, the luminance sensor device, and the iris recognition sensor device of the mobile phone, the smartphone, or the tablet PC. Therefore, it is possible to considerably reduce a bezel at one side of the mobile phone, the smartphone, or the tablet PC.

In addition, a second substrate SUB2 may be removed from the empty region EA. In this case, a first substrate SUB1, a thin film transistor layer TFTL, and a light-emitting element layer EML of a display unit DU may also be removed from a region overlapping the empty region EA.

Hereinafter, the recessed region BA of the touch sensor region TSA will be described in detail.

Figure 18:
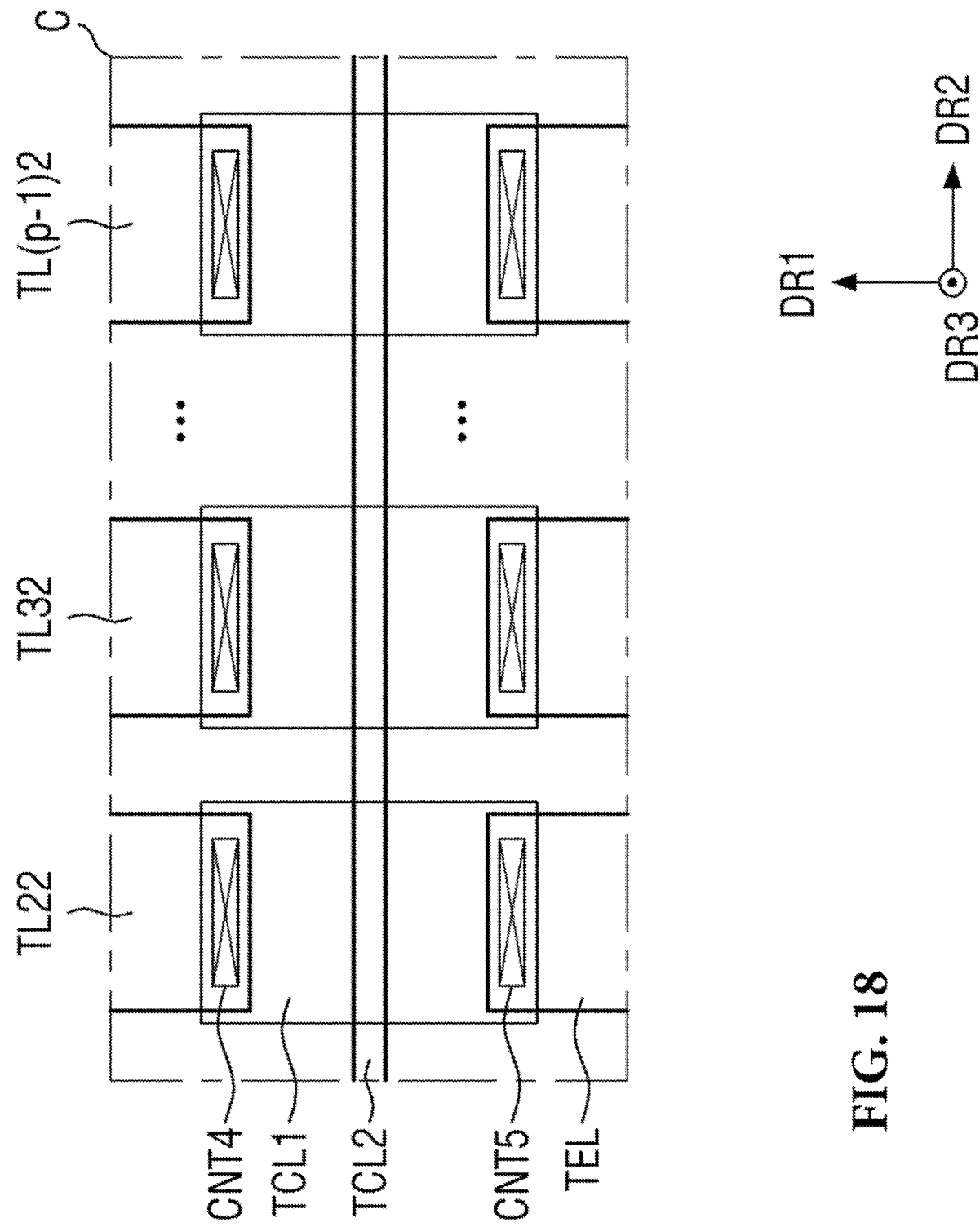
FIG. 18 is an enlarged plan view illustrating region C of FIG. 17 according to an embodiment of the present invention.

FIG. 18 is an enlarged plan view illustrating region C of FIG. 17.

Referring to FIG. 18, touch electrode lines TEL, first touch electrode connection lines TCL1, and second touch electrode connection lines TCL2 may be disposed in the recessed region BA.

The touch electrode lines TEL may be connected to first touch electrodes TE disposed at a first side of the touch sensor region TSA.

The touch electrode lines TEL may be spaced apart from second routing lines TL12 to TLp2 of touch driving wires TL1 to TLp in a plan view. The touch electrode lines TEL and the second routing lines TL12 to TLp2 spaced apart from each other may be electrically connected by the first touch electrode connection lines TCL1. A width of the touch electrode lines TEL may be substantially the same as a width of the second routing lines TL12 to TLp2.

The touch electrode lines TEL and the second routing lines TL12 to TLp2 may be composed of a second touch conductive layer 620. The touch electrode lines TEL and the second routing lines TL12 to TLp2 may be disposed in the same layer as the above-described connection lines CE. For example, the touch electrode lines TEL and the second routing lines TL12 to TLp2 may include the same material as the connection electrode CE or may include at least one material selected from the materials described above as the structural materials of the connection electrode CE.

First ends of the first touch electrode connection lines TCL1 may be connected to the second routing lines TL12 to TLp2 of the touch driving wires TL1 to TLp, and the second ends of the first touch electrode connection lines TCL1 may be connected to the touch electrode lines TEL.

A width of the first touch electrode connection lines TCL1 may be greater than a width of the second routing lines TL12 to TLp2 and a width of the touch electrode lines TEL. However, the present invention is not limited thereto.

The first touch connection lines TCL1 may be composed of the first touch conductive layer 610. The first touch connection line TCL1 may be disposed in the same layer as the first touch electrode TE. For example, the first touch connection line TCL1 may include the same material as the first touch electrode TE or may include at least one material selected from the materials described above as the structural materials of the first touch electrode TE.

The second routing lines TL12 to TLp2 and the touch electrode lines TEL may be disposed on the first touch electrode connection lines TCL1. The second routing lines TL12 to TLp2 may be electrically connected to the first touch electrode connection lines TCL1 through fourth contact holes CNT4 exposing the first ends of the first touch electrode connection lines TCL1. The touch electrode lines TEL may be electrically connected to the first touch electrode connection lines TCL1 through fifth contact holes CNT5 exposing the second ends of the first touch electrode connection lines TCL1.

The second touch electrode connection line TCL2 may connect a second touch electrode RE of the second touch sensor region TSA2 and a second touch electrode RE of the third touch sensor region TSA3. The first touch electrode connection line TCL1 and the second touch electrode connection line TCL2 may intersect with each other in a region C in the recessed region BA.

The second touch electrode connection line TCL2 may be disposed in a different layer from the first touch electrode connection line TCL1. The second touch electrode connection line TCL2 may be composed of the second touch conductive layer 620. The second touch electrode connection line TCL2 may be disposed in the same layer as the above-described connection line CE. For example, the second touch electrode connection line TCL2 may include the same material as the connection electrode CE or may include at least one material selected from the materials described above as the structural materials of the connection electrode CE.

Although embodiments of the present invention have been described heretofore, it will be understood by those skilled in the art that various changes in form and details may be made therein without departing from the spirit and scope of the present invention as set forth in the following claims present invention

What is claimed is:

1. A touch unit, comprising:
 a first touch electrode disposed in a touch sensor region of the touch unit;
 a touch driving wire electrically connected to the first touch electrode, wherein the touch driving wire includes a first muting line connected to a first side of the first touch electrode and a second routing line branched from the first routing line and connected to a second side of the first touch electrode;
 a pad electrode line spaced apart from the touch driving wire, the pad electrode line connected to a pad; and
 a pad connection line connected to the touch driving wire and the pad electrode line,
 wherein the pad connection line is disposed in a different layer from the touch driving wire, and wherein an area in which the pad connection line is in contact with the first routing line is greater than an area in which the pad connection line is in contact with the pad electrode line.

2. The touch unit of claim 1, wherein the pad connection line includes a first region in contact with the first routing line, and wherein a width of the first region in a first direction is greater than a width of the second routing line in the first direction.

3. The touch unit of claim 2, wherein the pad connection line includes a second region in contact with the pad electrode line, and wherein the width of the first region in the first direction is greater than a width of the second region in the first direction.

4. The touch unit of claim 3, wherein the touch driving wire includes a first touch driving wire and a second touch driving wire which are connected to different first toracl electrodes, wherein the pad connection line includes a first pad connection line and a second pad connection line, and wherein the first pad connection line is connected to the first touch driving wire and overlaps at least a portion of the second touch driving wire.

5. The touch unit of claim 4, wherein the first pad connection line connected tc the first touch driving wire further includes a third region overlapping the second routing line of the second touch driving wire, and wherein the width of the first region in the first direction is greater than a width of the third region in the first direction.

6. The touch unit of claim 5, further comprising:
a first touch conductive layer; a second touch conductive layer disposed above the first touch conductive layer; and
a touch insulating layer disposed between the first touch conductive layer and the second touch conductive layer,
wherein the pad electrode line includes a first pad electrode line and a second pad electrode line,
wherein the first touch electrode, the first pad connection line and the second pad connection line are composed of the first touch conductive layer, and
wherein the first touch driving wire and the second touch driving wire, and the first pad electrode line and the second pad electrode line are composed of the second touch conductive layer.

7. The touch unit of claim 6, wherein the touch insulating layer has first contact holes exposing; a first end of each of the first pad connection line and the second pad connection line, and second contact holes exposing second ends of each of the first pad connection line and the second pad connection line, the first routing line of the first touch driving wire and the first routing line of the second touch driving wire are electrically connected to the first pad connection line and the second pad connection line, respectively, through the first contact holes, and the first pad electrode line and the second pad electrode line are electrically connected to the first pad connection line and the second pad connection line, respectively, through the second contact holes.

8. A touch unit, comprising:
a plurality of first touch electrodes disposed in a touch sensor region of the touch unit;
a plurality of touch driving wires electrically connected to the plurality of first touch electrodes;
a plurality of pad electrode lines spaced apart from the plurality of touch driving wires and connected to a plurality of pads; and
a plurality of pad connection lines connected to the plurality of touch driving wires and the plurality of pad electrode lines, the plurality of pad connection lines disposed below the plurality of touch driving wires,
wherein the plurality of touch driving wires each include a first muting line connected to a first side of the plurality of first touch electrodes and a second routing line branched from the first routing line and connected to a second side of the plurality of first touch electrodes,
wherein the plurality of pad connection lines each include a first region in contact with the first routing line,
wherein the first routing line includes a fourth region that does not overlap a pad connection line of the plurality of pad connection lines, and
wherein a width of the fourth region in a first direction is greater than a width of the first region in the first direction.

9. The touch unit of claim 8, further comprising:
a first touch conductive layer;
a second touch conductive layer disposed above the first touch conductive layer, and
a touch insulating layer disposed between the first touch conductive layer and the second touch conductive layer,
wherein the plurality of first touch electrodes and the plurality of pad connection lines are composed of the first touch conductive layer, and
wherein the plurality of touch driving wires and the plurality of pad electrode lines are composed of the second touch conductive layer.

10. The touch unit of claim 9, wherein the touch insulating layer has a plurality of first contact holes exposing a first end of each of the plurality of pad connection lines and a plurality of second contact boles exposing a second end of each of the plurality of pad connection lines, wherein the first routing line is electrically connected to the pad connection line through a first contact hole, wherein a pad electrode line is electrically connected to the pad connection line through a second contact hole, and wherein the first contact hole is formed in the first region.

11. The touch unit of claim 10, wherein an area of the fourth region is greater than an area of the first region.

12. The touch unit of claim 11, wherein the plurality of pad connection lines each have a second region in contact with the pad electrode line, and wherein a width of the first region in the first direction is greater than a width of the second region in the first direction.

13. The touch unit of claim 12, further comprising:
a connection electrode that connects adjacent first touch electrodes to each other in the first direction,
wherein the connection electrode is composed of the second touch conductive layer.

14. The touch unit of claim 13, further comprising:
a plurality of second touch electrodes spaced apart from the first touch electrodes in the touch sensor region; and
a plurality of touch sensing wires electrically connected to the second touch electrodes,
wherein the plurality of second touch electrodes are composed of the first touch conductive layer, and
wherein the plurality of touch sensing wires are composed of the second touch conductive layer.

15. The touch unit of claim 14, further comprising a touch signal layer disposed in the same layer as the plurality of pad connection lines and spaced apart from the plurality of pad connection lines.

16. The touch unit of claim 15, wherein the touch signal layer is disposed below the plurality of touch driving wires, and wherein the touch signal layer at least partially overlaps the first routing line in a thickness direction.

17. The touch unit of claim 16, wherein the first routing line is electrically connected to the touch signal layer through a third contact hole exposing an end of the touch signal layer.

18. The touch unit of claim 17, wherein the plurality of touch driving wires each include a first touch driving wire and a second touch driving wire which are connected to different first touch electrodes, and wherein a pad connection line connected to the first touch driving wire at least partially overlaps the second routing line of the second touch driving wire.

19. The touch unit of claim 18, wherein the pad connection line connected to the first touch driving wire further includes a third region overlapping the second routing line of the second touch driving wire, and wherein a width of the fourth region in the first direction is greater than a width of the third region in the first direction.

20. A display device, comprising:
- a display unit including a display region which includes a plurality of pixels; and
- a touch unit including a touch sensor region which at least partially overlaps the display region,
- wherein the touch unit includes a plurality of first touch electrodes disposed in the touch sensor region, a plurality of touch driving wires electrically connected to the plurality of first touch electrodes, a plurality of pad electrode lines spaced apart from the plurality of touch driving wires and connected to a plurality of pads, and a plurality of pad connection lines connected to the plurality of touch driving wires and the plurality of pad electrode lines,
- wherein the plurality of pad connection lines are disposed below the plurality of touch driving, wires,
- wherein the plurality of touch driving wires each include a first routing line connected to a first side of the plurality of first touch electrodes and a second routing line branched from the first routing line and connected to a second side of the plurality of first touch electrodes, and
- wherein an area in which each pad connection line of the plurality of pad connection lines is in contact with the first routing line is different from a area in which each pad connection line of the plurality of pad connection lines is in contact with a pad electrode line of the plurality of pad electrode lines.

* * * * *